(12) United States Patent
Ullah et al.

(10) Patent No.: US 7,159,184 B2
(45) Date of Patent: Jan. 2, 2007

(54) METHOD AND GRAPHICAL USER INTERFACE FOR CREATING A CONFIGURATION FILE USED TO ALLOCATE COMPUTER SYSTEM RESOURCES AMONG WORKLOADS

(75) Inventors: Syed S. Ullah, Irving, TX (US); Michael D. Murphy, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 645 days.

(21) Appl. No.: 10/207,874

(22) Filed: Jul. 31, 2002

(65) Prior Publication Data

US 2004/0021678 A1   Feb. 5, 2004

(51) Int. Cl.
*G06F 3/01*   (2006.01)
*G06F 17/40*   (2006.01)
*G06F 12/02*   (2006.01)
*G06F 3/048*   (2006.01)

(52) U.S. Cl. ............... 715/762; 715/771; 715/779; 715/966; 715/970; 717/121; 711/170

(58) Field of Classification Search ........ 717/104–105, 717/121, 109–110, 1; 710/10, 29; 715/762, 715/771, 779, 966, 970; 711/170
See application file for complete search history.

(56) References Cited

U.S. PATENT DOCUMENTS 5,428,791 A * 6/1995 Andrew et al. ............. 717/121
5,924,101 A * 7/1999 Bach et al. ............. 707/103 R
6,053,951 A   4/2000 McDonald et al.
6,266,658 B1   7/2001 Adya et al.
6,295,531 B1   9/2001 Bae et al.
6,341,361 B1   1/2002 Basto et al.
6,396,516 B1   5/2002 Beatty
2004/0015949 A1 * 1/2004 Taylor ....................... 717/171

OTHER PUBLICATIONS

Nick et al., OS/390 Newsletter, Aug. 2000, Issue 3, pp. 1-118.*
WSC Performance Team (IBM), Workload Management Overview, Feb. 2002, pp. 1-75.*
WSC Performance Team (IBM), WLM Operational Considerations, Jul. 2000, pp. 1-25.*

* cited by examiner

*Primary Examiner*—Raymond J. Bayerl
*Assistant Examiner*—Namitha Pillai

(57) ABSTRACT

A method is disclosed for creating a configuration file for use with a resource allocator that allocates computer system resources, such as CPU resources, among workloads operating on the system. A software application referred to as a "wizard" generates a graphical user interface (GUI) having multiple linked input screens to prompt a user step-by-step to enter specifications for the workloads. The GUI displays a prompt for a user to define a workload and to configure a resource allocation policy for the defined workload. The CPU resource allocation policy specifies how resources are allocated to the defined workload. The wizard receives the requested specifications from a user input device. Based on the received specifications, a configuration file is created and may be used by a resource allocator to allocate resources among workloads according to the specifications.

25 Claims, 31 Drawing Sheets

METHOD AND GRAPHICAL USER INTERFACE FOR CREATING A CONFIGURATION FILE USED TO ALLOCATE COMPUTER SYSTEM RESOURCES AMONG WORKLOADS

TECHNICAL FIELD

The technical field relates generally to software for managing allocation of computer system resources, and more particularly to a graphical user interface used to create a configuration file for such software.

BACKGROUND

For computer systems operating multiple workloads, it is desirable to specify how computer system resources, such as central processing unit (CPU) resources are allocated to the workloads. As used herein, a "workload" refers to any process or group of processes that accesses computer system resources. For example, a number of workloads may operate on a server, performing functions for a number of users at remote terminals connected to the server via a network. Each of the workloads may require a certain amount of system resources to execute. It is therefore desirable for a user to specify parameters for allocating resources.

Various software applications (resource allocators) are known for allocating system resources among workloads. Such existing applications include the Workload Manager™ (WLM) product manufactured by Hewlett-Packard Company. Existing resource allocators, such as the WLM product, use a configuration file to specify how resources are allocated. To specify parameters for existing workload resource allocation, users of existing systems must understand the syntax of the resource allocator in order to create the configuration file. This requires that the user, such as a system administrator, spend time not only specifying parameters for workload resource allocation, but also learning the program syntax. In this sense, many existing systems are not user-friendly.

SUMMARY

A method is disclosed for creating a configuration file for use with a resource allocator that allocates computer system resources, such as CPU resources, among workloads operating on the system. A software application referred to as a "wizard" implements a graphical user interface (GUI) having multiple linked input screens that prompt a user step-by-step to enter specifications for the workloads. The GUI displays a prompt for a user to define a workload and to configure a resource allocation policy for the defined workload. The CPU resource allocation policy specifies how resources are allocated to the defined workload. The wizard receives the requested specifications from a user input device. Based on the received specifications, a configuration file is created and may be used by a resource allocator to allocate resources among workloads according to the specifications.

A computer-implemented GUI is also disclosed for prompting a user to enter specifications used to create a configuration file, which configuration file may be used to allocate computer system resources, such as CPU resources, among multiple workloads. The GUI includes multiple linked input screens that guide a user through steps in a process of creating the configuration file. The input screens include an input portion that prompts the user to enter the specifications. The input screens also include a guide portion that displays the steps of the process and indicates a current step for which specifications are requested in the input portion. The input screens also include an explanatory portion that displays information related to the current step.

A method is also disclosed for creating a configuration file for use with a resource allocator to allocate computer system resources among workloads operating on the computer system. The method uses a GUI to display prompts for specifications to be entered by the user using a user input device. The GUI includes multiple linked screens that guide the user through a process of creating the configuration file. The GUI prompts the user to identify a workload, to assign one or more executable files to the workload, and to assign a priority to the workload. The GUI also prompts the user to select a resource allocation policy for the workload. The resource allocation policy governs how computer system resources are allocated to the identified workload. The specifications are received from the user input device in response to the prompts, and a configuration file is generated based on the received information. The configuration file is displayed on the display and is stored in a memory, where the configuration file may be accessed by the resource allocator to allocate resources among the workloads.

DESCRIPTION OF THE DRAWINGS

The detailed description will refer to the following drawings, wherein like numerals refer to like elements, and wherein.

DETAILED DESCRIPTION

Figure 1:
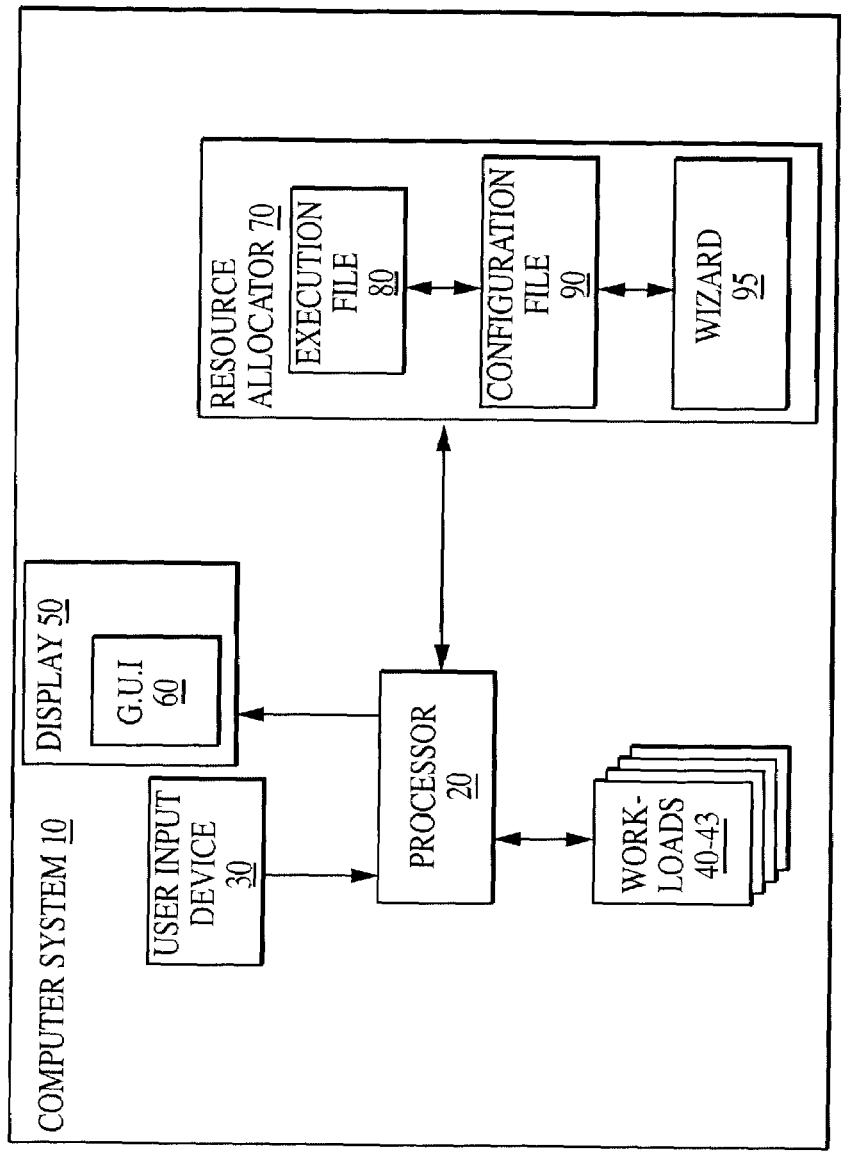
FIG. 1 shows a block diagram of a computer system that implements a graphical user interface (GUI) to create a configuration file for workload resource allocation.

FIG. 1 shows a block diagram of a computer system 10 that implements a graphical user interface (GUI) 60 to create a configuration file 90 for workload resource allocation. The computer system 10 has a processor 20 that receives signals from a user input device 30 and outputs data to a display 50. In use, the processor 20 executes workloads 40–43. As used herein a "workload" refers to any process or group of processes operating on the computer system 10 and using system resources. The workloads 40–43 may be stored, for example, in memory (not shown). Workload execution by the processor 20 is controlled by signals received by the processor 20 from the user input device 30. The display 50 displays the GUI 60 to assist the user in creating the configuration file 90 used by the system 10 to allocate resources among workloads 40–43.

In use, the workloads 40–43 use central processing unit (CPU) resources. As used herein, "CPU resources" include the processor 20, and any other processors (not shown) available to the workloads 40–43 operating on the system 10. In a system 10 executing multiple workloads 40–43 using one or more processors (e.g. 20), the CPU resources may be allocated to the workloads 40–43 as time slices, whereby each workload 40–43 is given access to the CPU resources for a duration specified by the user. The CPU resources are allocated among workloads 40–43 by a resource allocator 70, which may be implemented using the processor 20. The resource allocator 70 includes an execution file 80 that causes the CPU resources to be allocated among the workloads 40–43 according to specifications set by the user. The execution file 80 accesses the configuration file 90 containing the specifications set by the user, and allocates the CPU resources based on the specifications.

To create the configuration file 90, the user specifies parameters for execution of the workloads 40–43, using the user input device 30 to interact with the GUI 60 shown on the display 50. The GUI 60 includes a plurality of linked display screens (not shown) that provide step-by-step assistance to the user for specifying resource allocation. The screens may be traversed using the input device 50 to select on-screen options to move forward or backward in the configuration process. The GUI 60 is implemented by a software application, referred to as a "wizard" 95. As used herein, a wizard 95 includes any application that generates the GUI 60 for prompting the user to enter specifications used to create the configuration file 90. The GUI 60 allows the user to create the configuration file 90 and displays the configuration file 90 on the display 50 for the user to view before the configuration file 90 is implemented by the resource allocator 70. The resource allocator 70 may be stored in memory (not shown).

Figure 2:
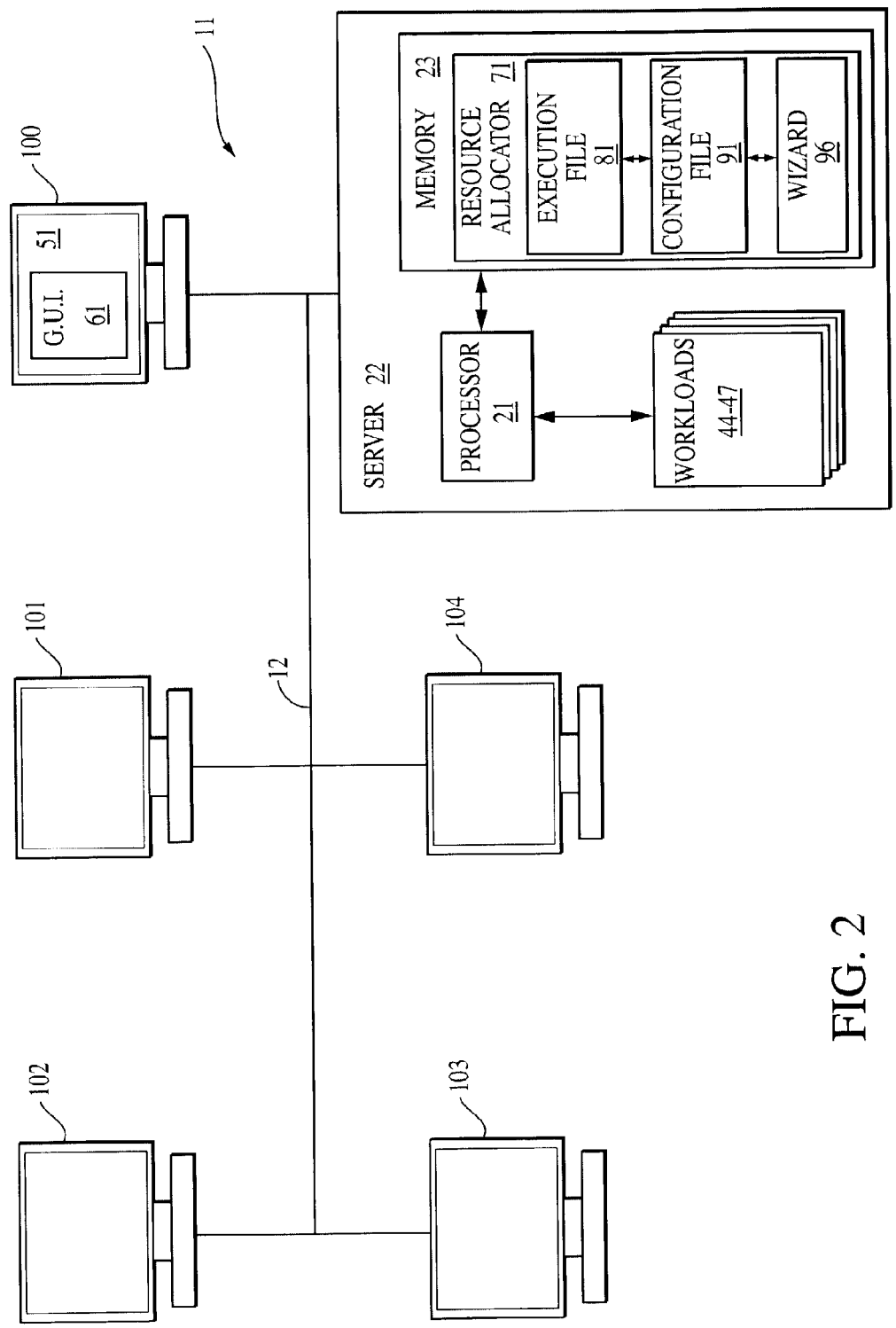
FIG. 2 is a block diagram of another embodiment of a computer system, which includes terminals connected to a server by a network.

FIG. 2 shows another embodiment of a computer system 11 having a plurality of terminals 100–104 connected via a network 12, to a server 22. The network 12 may be, for example, a local area network (LAN) or a wide area network (WAN). In the embodiment of FIG. 2, a resource allocator 71 is stored in memory 23 of the server 22 where the resource allocator 71 is accessed by a processor 21, which processor 21 is also part of the server 22. The resource allocator 71 includes an execution file 81 for implementing the allocations specified by the user. The execution file 81 accesses a configuration file 91 created by a user using the GUI 61 generated on a display 51 portion of the terminal 100 by a wizard 96.

In the embodiment of FIG. 2, workloads 44–47 are executed by the processor 21 of the server 22 for use by one or more terminals 100–104. One of the terminals, such as the terminal 100, includes the display 51 on which the GUI 61 is displayed. The terminal 100 also includes a user input device (not shown) that is used to interact with the GUI 61 to create the configuration file 91. The configuration file 91 created by the user through the GUI 61 controls the allocation of CPU resources to the workloads 44–47, which may be used by the terminals 100–104.

Figure 3:
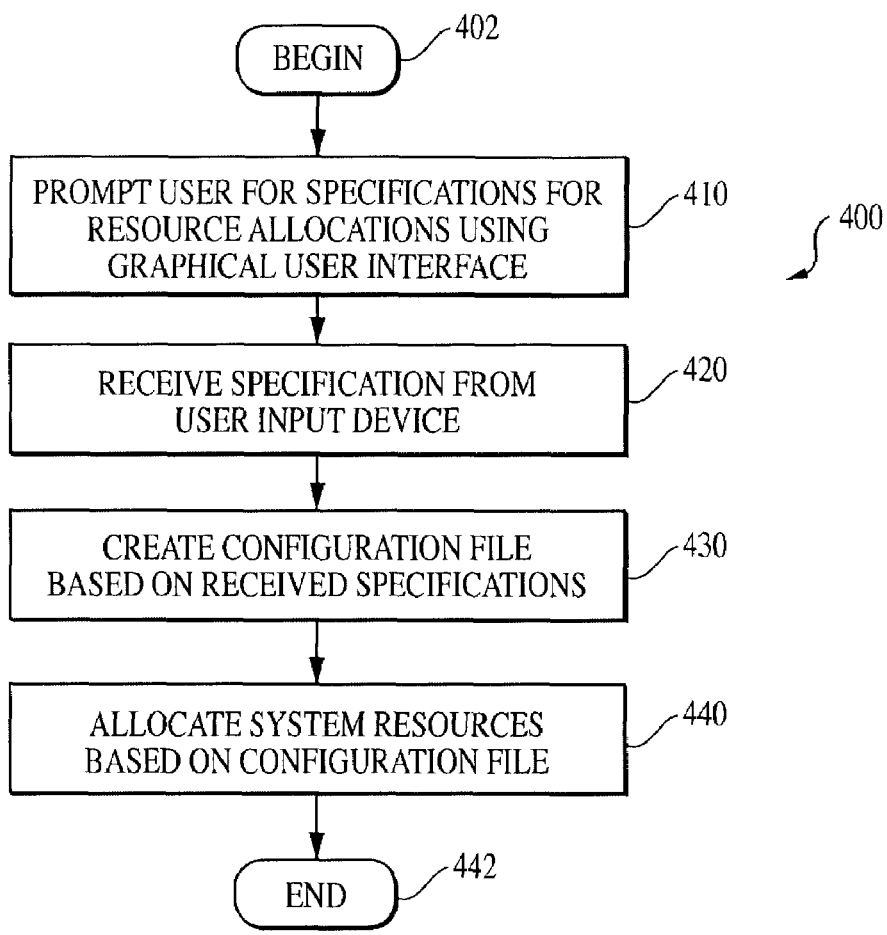
FIG. 3 is a flow chart of a method of allocating CPU resources among workloads using a GUI.

FIG. 3 shows a flow chart of a method of allocating CPU resources among workloads using a GUI (60 in FIG. 1). The method 400 begins 402 by prompting the user for specifications 410 for workload resource allocation using the GUI (60 in FIG. 1). Specifications are received 420 by the wizard (95 in FIG. 1) from the user input device (30 in FIG. 1). A configuration file (90 in FIG. 1) is created 430 based on the received specifications. System resources are allocated 440 among workloads (40–43 in FIG. 1) based on the configuration file (90 in FIG. 1), and the method ends 442.

Figure 4:
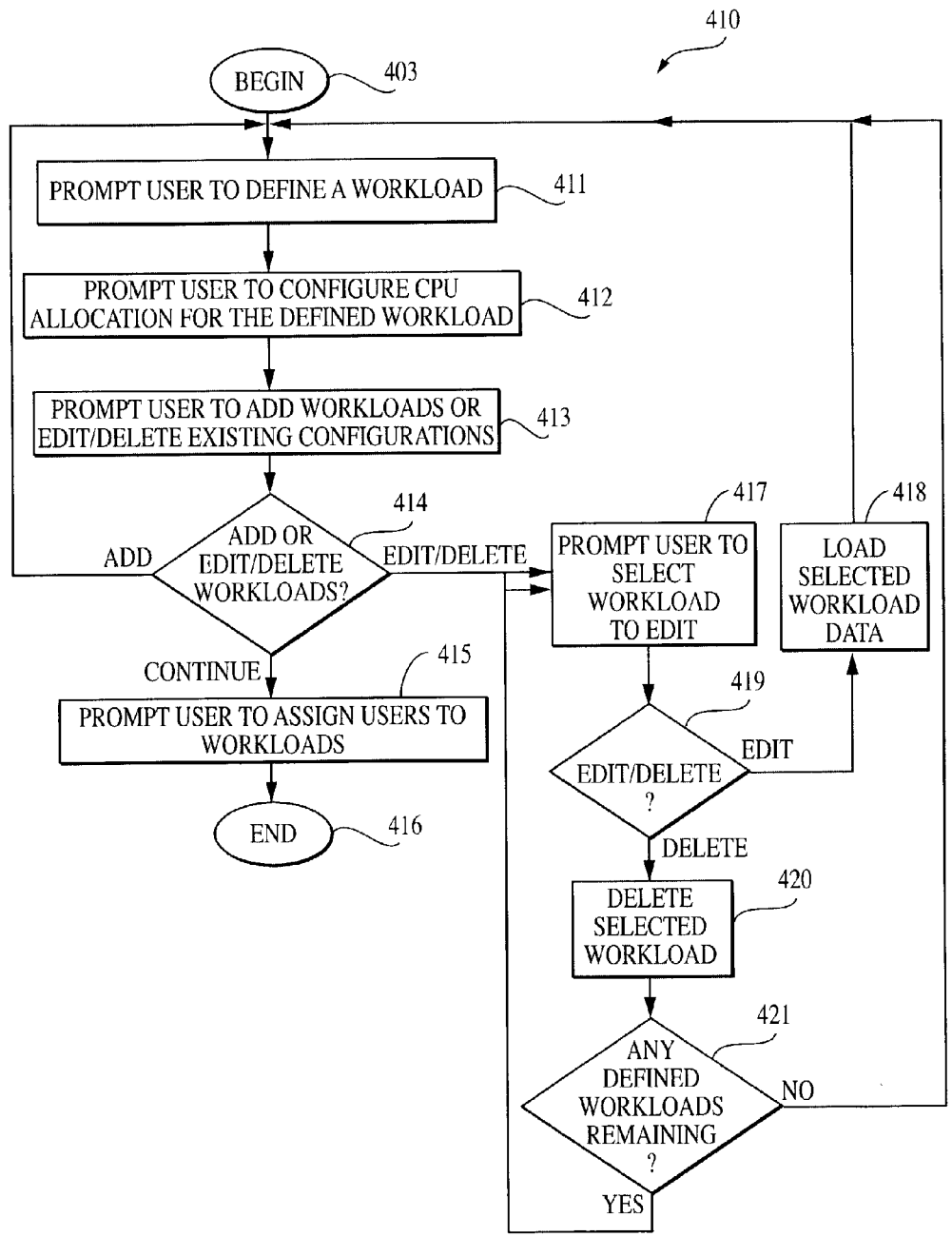
FIG. 4 is a flow chart of one implementation of the step of prompting the user for specifications for resource allocations.

FIG. 4 shows a flow chart of one implementation of the step for prompting the user for specifications for resource allocations 410. The step 410 begins 403 by prompting the user to define a workload 411. The GUI (60 in FIG. 1) then prompts the user to configure CPU resource allocations for the defined workload 412, using the GUI (60 in FIG. 1).

The example of FIG. 4 allows the user to define workloads or to edit or delete previously defined workloads using the wizard (95 in FIG. 1). The GUI (60 in FIG. 1) prompts the user to define any additional workloads or to edit or delete existing workloads 413. Based on a response from the user, the wizard (95 in FIG. 1) determines 414 whether there are additional workloads to be defined or edited/deleted by the user, or if the user has selected the option to proceed to the next screen. If there are additional workloads ("Add" branch at block 414), the wizard (95 in FIG. 1) returns to the beginning 403 of the step 410 and again prompts the user to define a new workload 411.

If the user has selected an option to edit or delete an existing workload ("Edit/Delete" branch at 414), the GUI (60 in FIG. 1) prompts the user to select an existing workload to edit or delete 417. The GUI (60 in FIG. 1) then prompts the user to either edit or delete the selected workload 419. If the user selects the edit option, the wizard (95 in FIG. 1) then loads the data for the selected workload 418, and returns to the beginning 403 of the step 410 and again prompts the user to define the selected workload 411. In one embodiment, when the user is editing a selected workload, data previously entered for the selected workload is displayed on the GUI (60 in FIG. 1) so that the user can view the data that has already been specified, in deciding how to edit the workload. If the user selects the option to delete the selected workload ("Delete" branch at block 419), the definition for the selected workload is deleted 420, and the wizard (95 in FIG. 1) determines whether there are any defined workloads remaining 421. If there are no more defined workloads, then the wizard (95 in FIG. 1) returns to the beginning 403 of the step 410 and again prompts the user to define a workload 411. If there are any defined workloads remaining ("yes" branch at block 421), then the example shown in FIG. 4 again prompts the user to select one of the defined workloads for editing or deleting 417.

If the user selects the option to continue with the process of creating the configuration file ("continue" branch at block 414), rather than creating additional workloads or editing/deleting defined workloads, then the GUI (60 in FIG. 1) prompts the user to assign users to the workloads 415, in the embodiment shown. In some implementations, it may be desirable for the system (10 in FIG. 1) to automatically recognize that particular workloads (40–43 in FIG. 1) are associated with a particular user. For example, the system (10 in FIG. 1) may reallocate resources to workloads (40–43 in FIG. 1) when a particular user begins using certain workloads. The step 410 is complete 416 in the embodiment shown in FIG. 4 after the users are assigned. Although the example of FIG. 4 illustrates a flow chart of the process, the GUI (60 in FIG. 1) may include "back" or "forward" selection options that allow the user to traverse the flow chart of FIG. 4 forward or backward to enter data requested.

Figure 5:
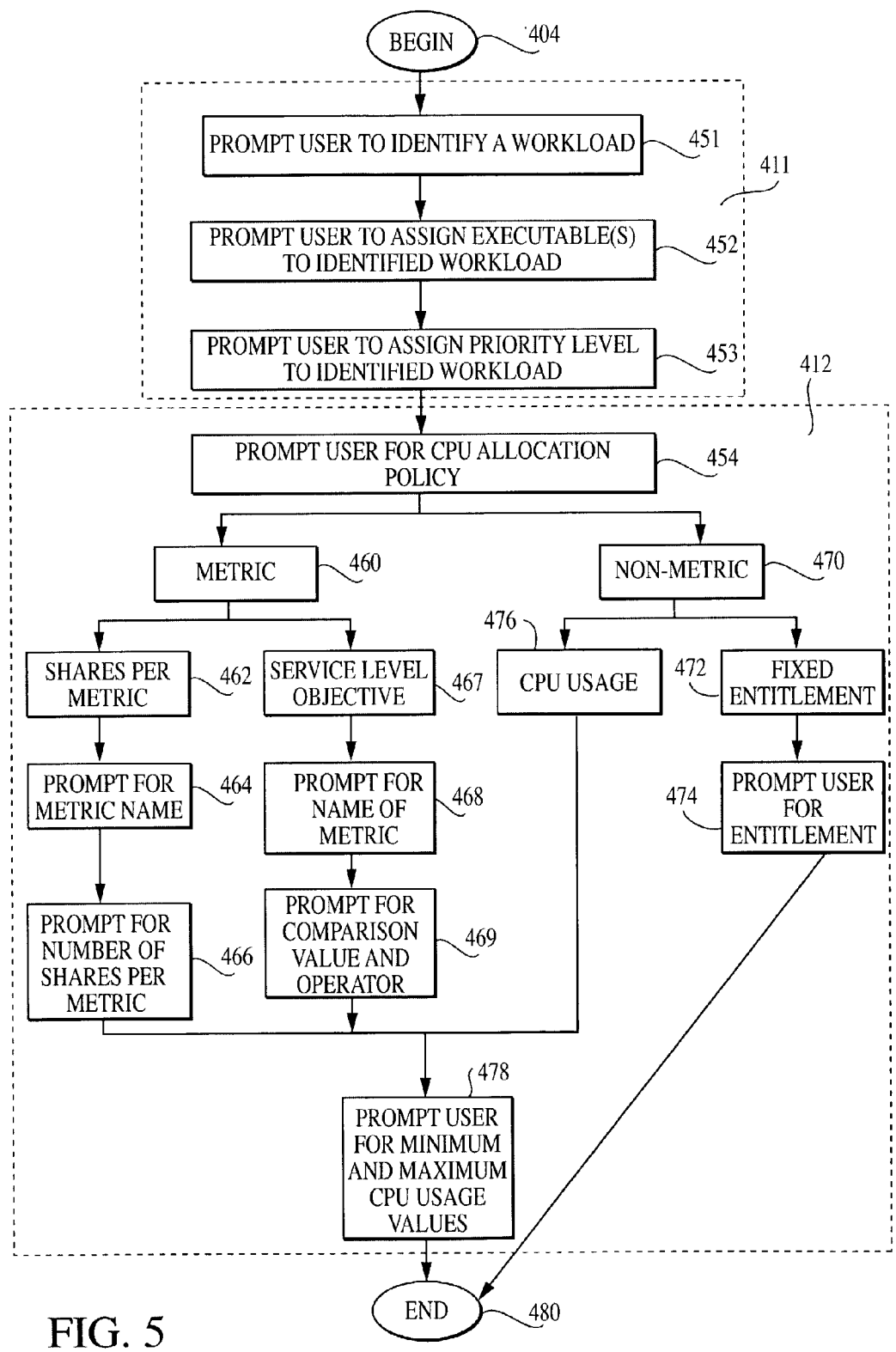
FIG. 5 is a flow chart of one embodiment of the steps of prompting the user to define a workload and prompting the user to configure CPU resource allocations for the defined workload.

FIG. 5 shows a flow chart of one embodiment of the steps of prompting the user to define a workload 411 and prompting the user to configure CPU resource allocations for the defined workload 412. In the embodiment of FIG. 5, the GUI (60 in FIG. 1) begins 404 and prompts the user to identify the workload 451, as the initial step in defining a workload 411. The GUI (60 in FIG. 1) then prompts the user to assign executable files to the identified workload 452. The GUI (60 in FIG. 1) then prompts the user to assign a priority level to the identified workload 453. In the embodiment shown, each workload (40–43 in FIG. 1) is assigned a priority value. CPU resources are allocated by the resource allocator (70 in FIG. 1) based on the workloads' relative priorities, subject to other CPU resource allocation policies specified for the workload, as described herein.

As part of the step for prompting the user to configure CPU resource allocation for the defined the workload 412, the embodiment of FIG. 5 first prompts the user to select a CPU resource allocation policy 454. The CPU resource allocation policy governs how CPU resources are allocated to the defined workload. In the embodiment shown in FIG. 5, the GUI (60 in FIG. 1) allows the user to select either a metric-based 460 or a non-metric-based 470 CPU resource allocation policy. As used herein, the term "metric" refers to any measure of operation of a workload (40–43 in FIG. 1) that may be expressed as a numerical value. For example, a metric may be specified for a completion time of a process or a step in a process performed by a workload (40–43 in FIG. 1). Another example of a metric is the number of users logged into the system (10 in FIG. 1) who are accessing the workload (40–43 in FIG. 1). Metrics may be predefined by the resource allocator (70 in FIG. 1) in one embodiment. If the user selects a metric-based policy, the GUI (60 in FIG. 1) prompts the user with a choice between either a shares-per-metric policy 462 or a service level object policy 467. If the user selects a shares-per-metric 462, then the GUI (60 in FIG. 1) prompts the user for a metric name 464 and prompts the user to enter the number of shares per metric 466 to be allocated to the workload (40–43 in FIG. 1). By way of example, in the case of a metric based on a number of users logged into the system (10 in FIG. 1), the user might select a shares-per-metric policy for the workload (40–43 in FIG. 1) so that the CPU resources allocated to the workload (40–43 in FIG. 1) increase as the number of users increases. The user might, for example, specify a value of three shares of CPU resources for each user. In the example of FIG. 5, unless the user selects a fixed-entitlement policy (block 474 described herein), the GUI (60 in FIG. 1) prompts the user to enter maximum and minimum limits on CPU resource allocation for the workload 478. The minimum and maximum limits may be used to ensure that the CPU allocation is between the limits, notwithstanding other allocation policies. The method described in FIG. 5 then ends 480.

If the user selects a service level objective, metric-based policy 467, the GUI (60 in FIG. 1) prompts the user for a name of the metric 468 and prompts the user for a comparison value and a comparison operator 469. For example, the user may be allowed to select whether a specified metric is greater than or less than a specified comparison value. An example of a service level objective metric is execution time for a specified process or transaction performed by a workload (40–43 in FIG. 1). In such an example, the GUI (60 in FIG. 1) may prompt the user to specify a maximum transaction time, and resources may be allocated by the resource allocator (70 in FIG. 1) to attempt to keep the transaction time below the specified value. In use, the resource allocator (70 in FIG. 1) monitors the transaction time and reallocates CPU resources dynamically to attempt to ensure that the transaction time is less than the specified value. The GUI (60 in FIG. 1) then prompts the user to enter maximum and minimum limits on CPU resource allocation for the workload 478, and the method ends 480 in this example.

In the example of FIG. 5, if the user selects a non-metric-based policy 470, the GUI (60 in FIG. 1) allows the user to select from a fixed-entitlement policy 472 or CPU-usage policy 476. A fixed-entitlement policy allocates a specified amount of CPU resources to the workload (40–43 in FIG. 1). If the user selects a fixed-entitlement policy 472, the GUI (60 in FIG. 1) prompts the user for an entitlement value 474. This entitlement is then allocated to the specified workload. The method shown in FIG. 5 then ends 480.

If the user selects the CPU-usage policy 476, then the GUI (60 in FIG. 1) prompts the user for minimum and maximum CPU entitlement values 478, and CPU resources are allocated to the workload within the specified range, based on the availability of CPU resources, the percentage of allocated CPU resources actually used by the workload, and the workload's priority to the resources relative to other workloads. A CPU-usage policy monitors the workload's actual usage of CPU resources and allocates CPU resources to the workload based on the actual usage. For example, if a workload uses substantially all of the resources allocated to the workload, then a CPU-usage policy may increase the resources allocated. Conversely, if a workload uses only a small portion of the allocated resources, then a CPU-usage policy may decrease the amount of resources allocated to the workload, until such time as the workload requires additional resources. One specific implementation uses threshold values to increase or decrease allocation of resources. For example, if actual usage exceeds 75% of allocated resources, then the CPU-usage policy increases allocation for the workload. Conversely, if actual usage is less than 50% of allocated resources, then the CPU-usage policy decreases the workload's allocation. The step 412 ends 480 after specifications are received by the wizard (95 in FIG. 1) for the selected CPU resource allocation policy.

FIGS. 6–15B show example screens of the GUI (60 in FIG. 1) used to implement the method of creating the configuration file (90 in FIG. 1), as described with respect to FIG. 5. The GUI (60 in FIG. 1) may be implemented in a variety of computer and operating systems, including a Unix-based system or a Microsoft Windows-based system. The screens are linked such that the user can traverse from one screen to another by making a selection with the user input device (30 in FIG. 1). In the embodiment shown in FIGS. 6–15B, the user can traverse the screens forward or backward, one screen at a time, using forward and back buttons, described herein. The input portion of the screen, described herein, displays a prompt for specifications of data related to the selected entry.

Figure 6:
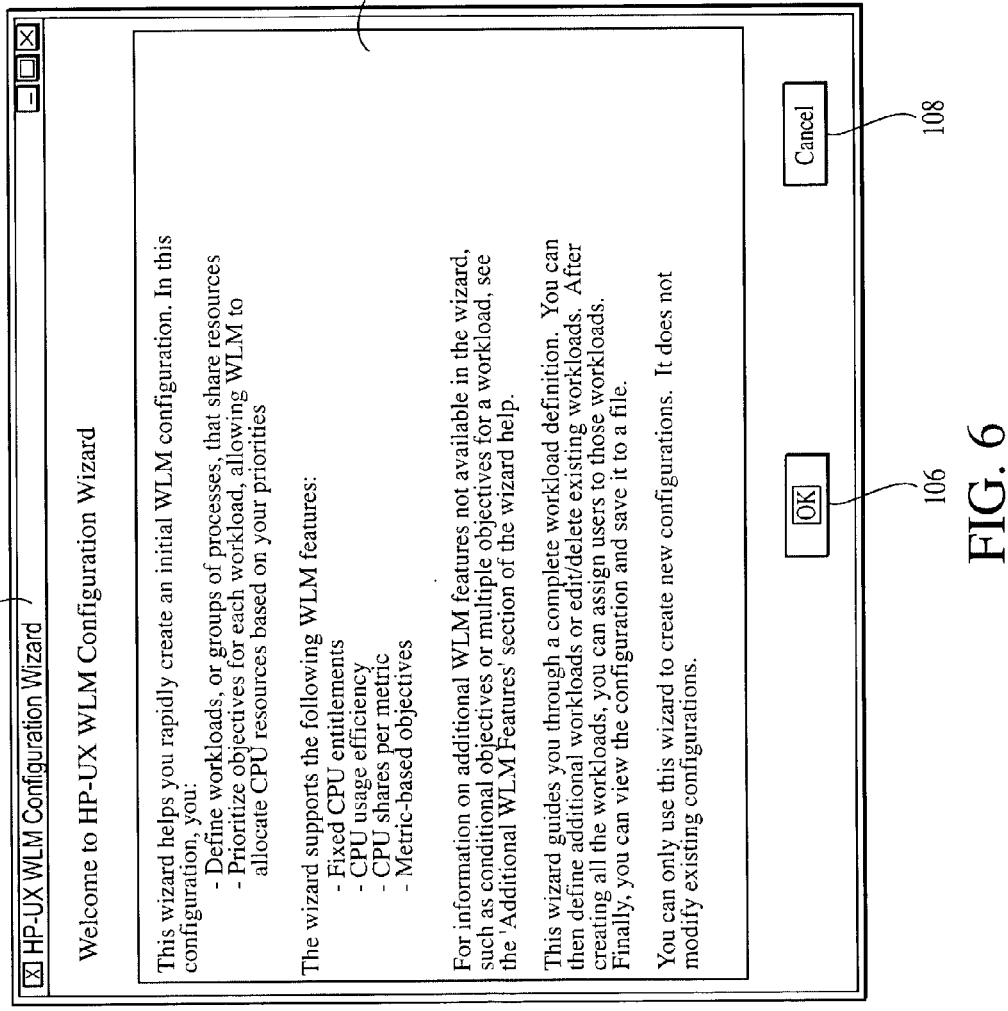
FIG. 6 is an example introductory screen of the GUI.

FIG. 6 shows a introduction screen for the GUI (60 in FIG. 1). The introduction screen 102 provides general background information to the user regarding the process of creating a configuration file (90 in FIG. 1). The screen 102 also allows the user to select a "cancel" button 108 to exit the wizard (95 in FIG. 1), and allows the user to select "OK" button 106 to proceed to the next screen in the configuration process. As used herein, a "button" refers to any portion of the GUI (60 in FIG. 1) that, when selected by the user input device, causes the wizard (95 in FIG. 1) to perform a function. For example, selection of the "OK" button 106 causes the wizard (95 in FIG. 1) to display the next screen in the GUI (60 in FIG. 1).

Figure 7A:
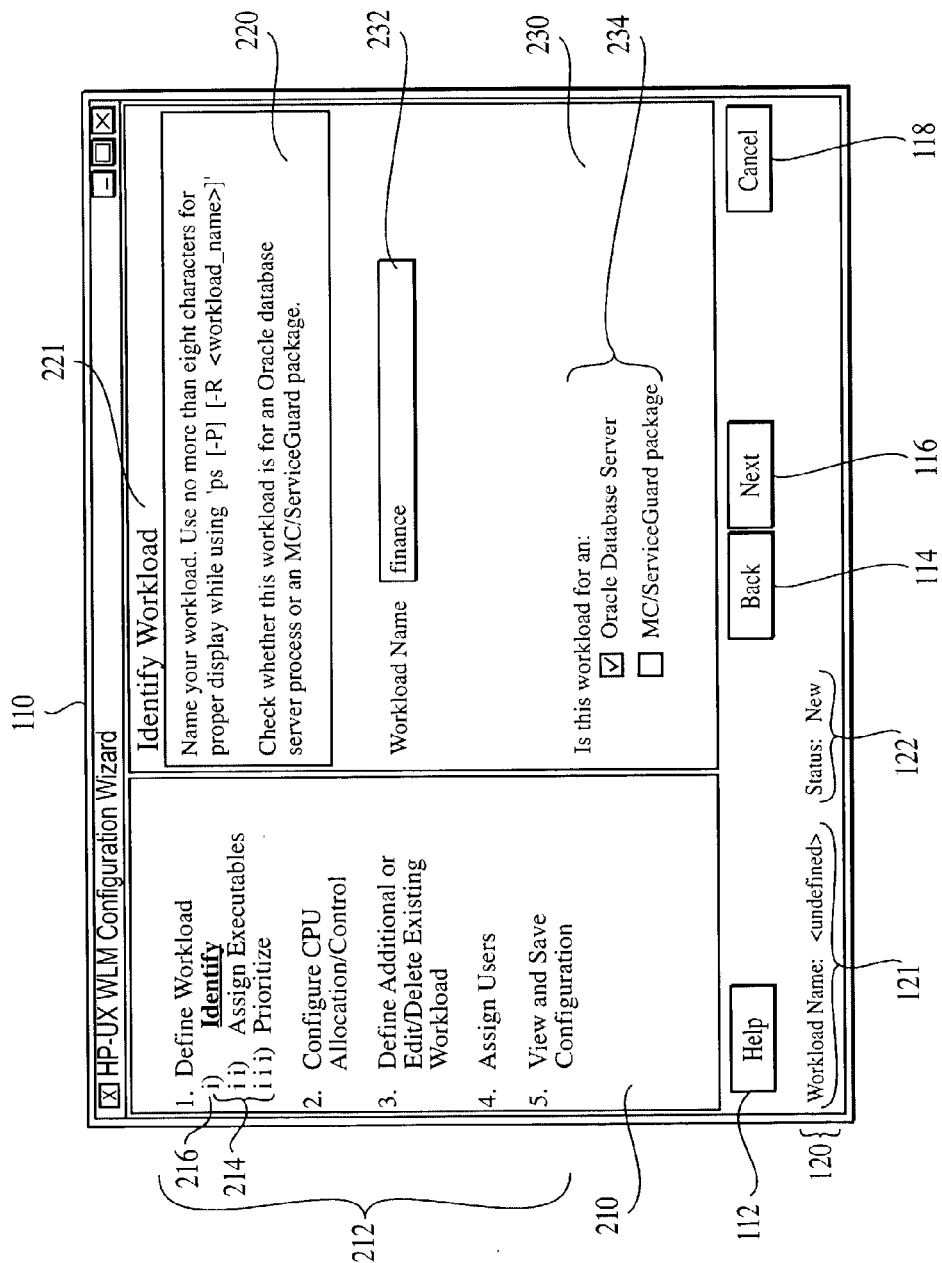
FIGS. 7A–7F are example input screens of the GUI used to define a workload.

FIG. 7A shows an input screen 110 of the GUI (60 in FIG. 1) corresponding to the step of prompting the user to define a workload (block 451 in FIG. 5). The input screens (e.g. 110) guide the user step-by-step through the process of creating the configuration file (90 in FIG. 1). The input screen 110 shown in FIG. 7A includes a guide portion 210, an explanatory portion 220, and an input portion 230. The input portion 230 displays information about the configuration process and/or receives specifications entered by the user. The example screen 110 shown in FIG. 7A prompts the user to identify a workload (40–43 in FIG. 1) by providing a name in a text box 232. The example of FIG. 7A also allows the user to indicate whether the workload (40–43 in FIG. 1) is for an Oracle Database Server or an MC/Service-Guard Package, or both, in a selection portion 234. The Oracle Database Server™ manufactured by Oracle Corporation and the Multi-Computer (MC)/ServiceGuard Package™ manufactured by Hewlett-Packard Company are products commonly used by some users and are therefore included for users' convenience, in this example. Users often use an Oracle database as a workload and often use the MC/ServiceGuard™ to manage computer system resources, so information for these specific products is incorporated into the GUI (60 in FIG. 1) in one example. The example shown in FIG. 7A allows the user to specify these common products to incorporate the functionality of these examples into the configuration file (90 in FIG. 1). When a user selects one of these commonly used workloads, the wizard (95 in FIG. 1) automatically retrieves known configuration information for the workloads, such as the executable files and their paths on the system (10 in FIG. 1). Other implementations may allow the user to define a workload (40–43 in FIG. 1) by reference to other applications used in connection with the workload, or may omit reference to any particular products. In the example of FIG. 7A, the user has entered "finance" as the workload name in the text box 232 and has associated the "finance" workload with the Oracle Database Server in the selection portion 234.

The guide portion 210 of the input screen 110 outlines the configuration file creation process for the user. In the example screen 110 of FIG. 7A, the guide portion 210 shows configuration steps 212 of the process for creating the configuration file (90 in FIG. 1). In the example shown, the steps 212 include defining a workload, configuring a CPU resource allocation/control policy for the defined workload, defining additional workloads, assigning users to the workloads, and viewing and saving the resulting configuration file. The configuration steps 212 are shown in sequential order in the embodiment of FIG. 7A and include sub-steps 214 displayed below one or more current steps, in a tree structure. The screen 110 shown in FIG. 7A relates to the "Identify" sub-step of the "Define Workload" step. The guide portion 210 indicates the current step 216 (the "Identify" sub-step) by highlighting it among the sub-steps 214. In the examples shown in FIGS. 7A–7F and 8A–8G, the current step (e.g., 216) is indicated using bold and underlining in the font. In other examples, various indicators may be used to refer to the current step 216. In the example of FIG. 7A, the guide portion 210 uses a tree structure and expands the display to show the current step 216 and the other sub-steps 214 below the "Identify" step.

The explanatory portion 220 of the input screen 110 provides additional information related to the current step 216. In the example shown, the explanatory portion 220 displays for the user what information is requested in the input portion 230. The explanatory portion 220 has a title bar 221 indicating a title for the current step 216.

The screen 110 shown in FIG. 7A also includes a status bar 120 that indicates the name 121 of the workload that is currently being defined and the status 122 of the workload as "new" or "existing." In the example shown in FIG. 7A, the status bar 120 indicates that the workload ("finance") is yet undefined and the status is new, because the user is still in the process of defining the workload. Once the workload has been defined—for example if the user is editing specifications for an existing workload—the status bar 120 reflects that the status 122 of the workload is "existing" rather than new.

The screen 110 also includes a help button 112. The help button 112 appears throughout the input screens (e.g., 110) and is linked to a help screen (not shown). By selecting the help button 112, the user may immediately access a help screen (not shown) that provides further assistance with the wizard (95 in FIG. 1). In one example, the help screen (not shown) may appear in a separate dialog box or "window" on the display (50 in FIG. 1) so that the user can view the help screen (not shown) and the current input screen (e.g., 110) at the same time.

The screen 110 also includes a cancel button 118 that allows the user to exit the wizard (95 in FIG. 1) and cancel the process of creating a configuration file (90 in FIG. 1). The screen 110 also includes "back" and "next" buttons 114, 116 that allow the user to traverse the input screens forward or backward during the configuration process. Because the screen (110 in FIG. 7A) shows the first step in the process in this example, the back button 114 may be unavailable and in one embodiment (not shown) may be indicated by a lightened "back" title on the button 114. When the user has entered the requested specifications in the input portion 230, the user selects the next button 116 using the user input device (30 in FIG. 1) to proceed to the following screen in the GUI (60 in FIG. 1).

In one embodiment, the wizard (95 in FIG. 1) verifies the input data before proceeding to the following screen in the GUI (60 in FIG. 1), to ensure that the user has entered a valid entry. For example, if the current screen (e.g. 110) includes a text box that requires a numerical value within a specified range, the wizard (95 in FIG. 1) may verify that the user has entered a numerical value, rather than other text, and that the value is within the specified range. The GUI (60 in FIG. 1) may display a error message, for example in a separate dialog box (not shown), if incorrect data has been entered.

Figure 7B:
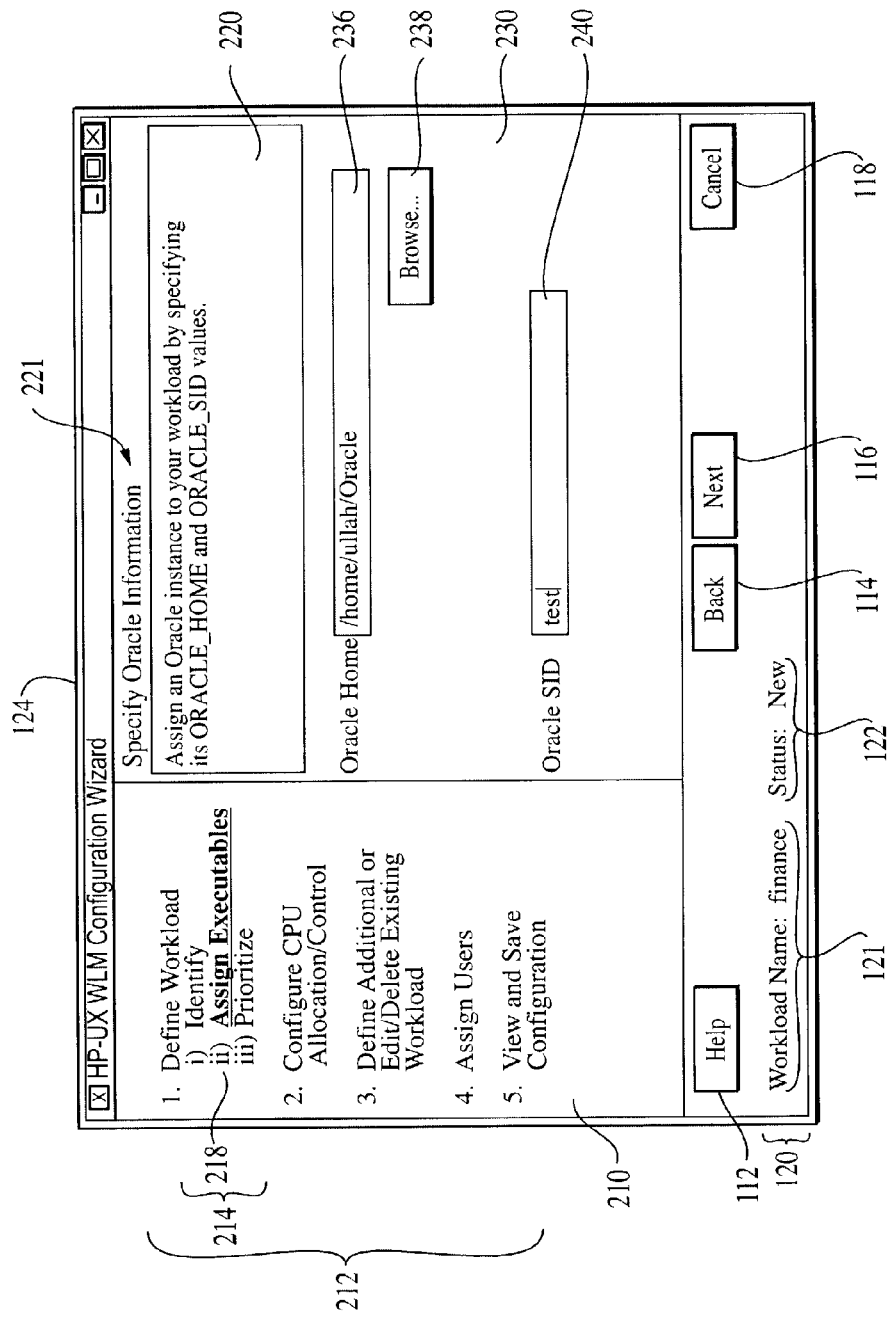

FIGS. 7B–7E show example input screens of the GUI (60 in FIG. 1) corresponding to the step of prompting the user to assign executable files (block 452 in FIG. 5) to the workload identified in FIG. 7A. FIG. 7B shows an input screen 124 in the GUI (60 in FIG. 1), which is displayed after the user has selected the next button 116 in the previous screen (110 in FIG. 7A). In FIG. 7B, the current step 218 is the "Assign Executables" step 218, and is indicated in the guide portion 210 as the current step 218 using highlighting or a similar indication. Because the user associated the current workload ("finance") with the Oracle Database Server in the selection portion 234 of the input screen 110 in FIG. 7A, the input portion 230 of the screen 124 in FIG. 7B prompts the user for information related specifically to the Oracle instance, including an "Oracle Home" and an "Oracle SID" in respective text boxes 236, 240. The title bar 221 of the explanatory portion 220 reads, "Specify Oracle Information," and the explanatory portion 220 contains text explaining that the user is requested to specify Oracle instance information associated with the workload being defined. In the specific example shown in FIG. 7B involving an Oracle Database Server, the explanatory portion 220 displays text indicating that the user should enter the ORACLE_HOME and ORACLE_SID values for the workload.

A "browse" button 238 allows the user to view a list of directories on the computer system (10 in FIG. 1) to identify the executable file or files and directory or directories that should be associated with the current workload ("finance"). In the example of FIG. 7B, the user has indicated that the path for the Oracle Home is "/home/ullah/Oracle" by entering this in the text box 236. The user has labeled this Oracle SID as "test." In the status bar 120 at the bottom of the screen 124, the workload is identified as "finance," as labeled on the previous screen (110 in FIG. 7A) and its status is new.

Figure 7C:
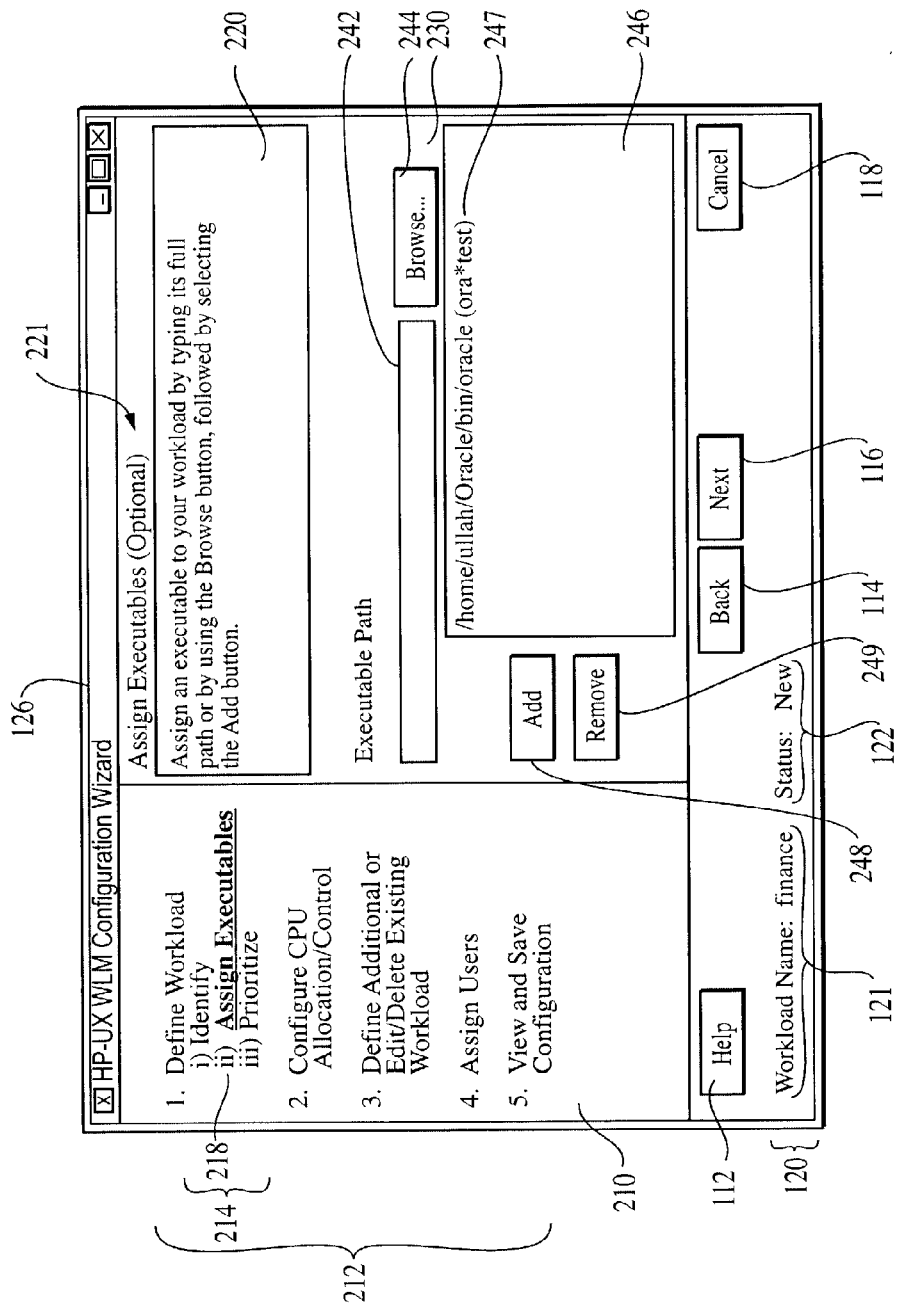

FIG. 7C shows another screen 126 in the GUI (60 in FIG. 1), which is displayed after the user has selected the next button 116 in the previous screen (124 in FIG. 7B). The screen 126 shown in FIG. 7C is another screen used to assign executable files to the current workload ("finance"), and the current step 218 remains "Assign Executables." The title bar 221 of the explanatory portion 220 reads "Assign Executables (Optional)." The input portion 230 includes a text box 242 for entering an executable path, along with a browse button 244 that allows the user to browse directories on the system (10 in FIG. 1), if desired. A second text box 246 displays selected paths 247 that have been associated with the current workload, and "add" and "remove" buttons 248, 249 allow the user to add or remove executables assigned to the workload ("finance"). In the example shown, because the user has previously associated the workload with the Oracle Database Server (see FIG. 7A), the path name "/home/ullah/Oracle/bin/oracle (ora*test)" is automatically entered as a path 247 in the text box 246, because this path 247 is associated with the Oracle Database Server. The text box 242 allows the user to specify additional paths for the workload ("finance"), if desired.

Figure 7D:
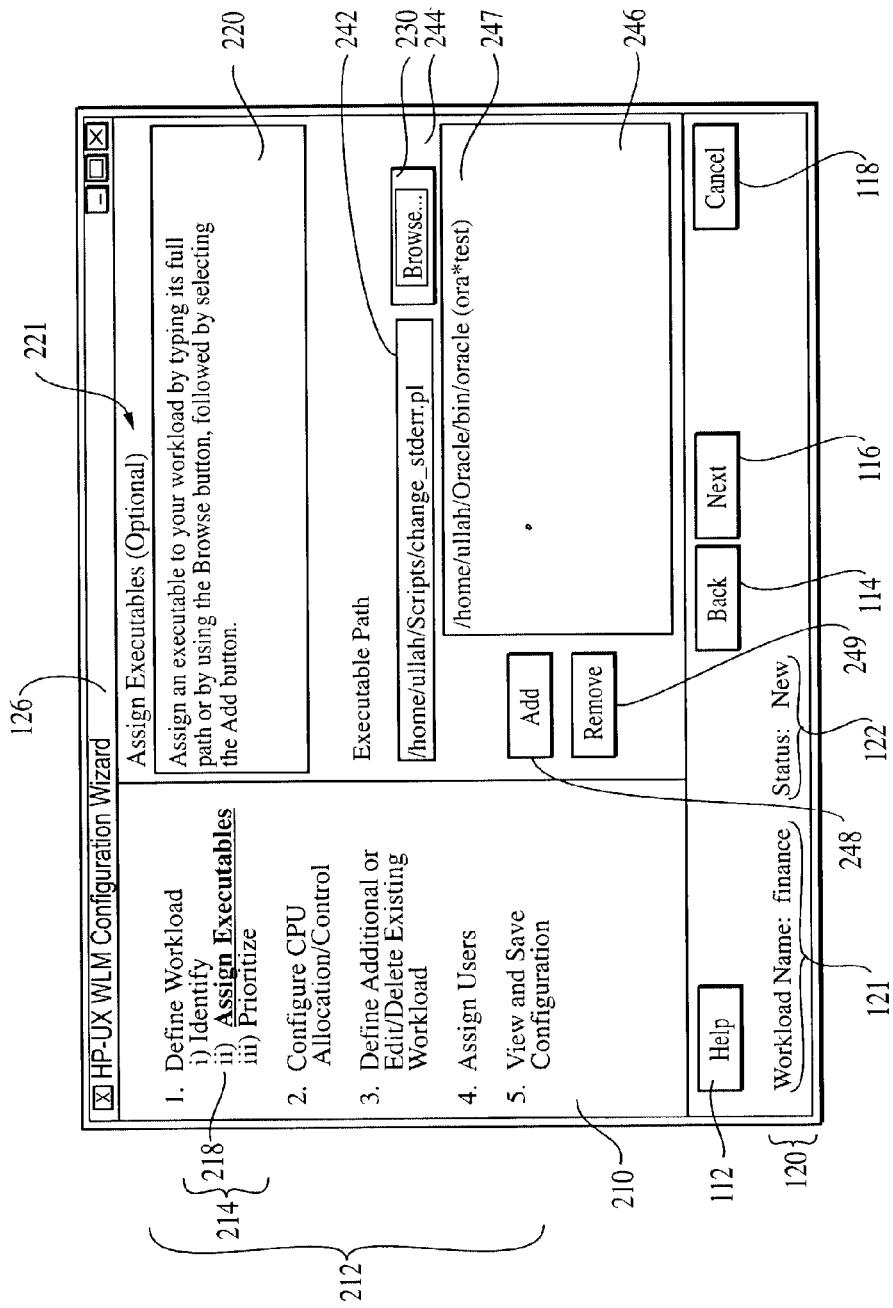
Figure 7E:
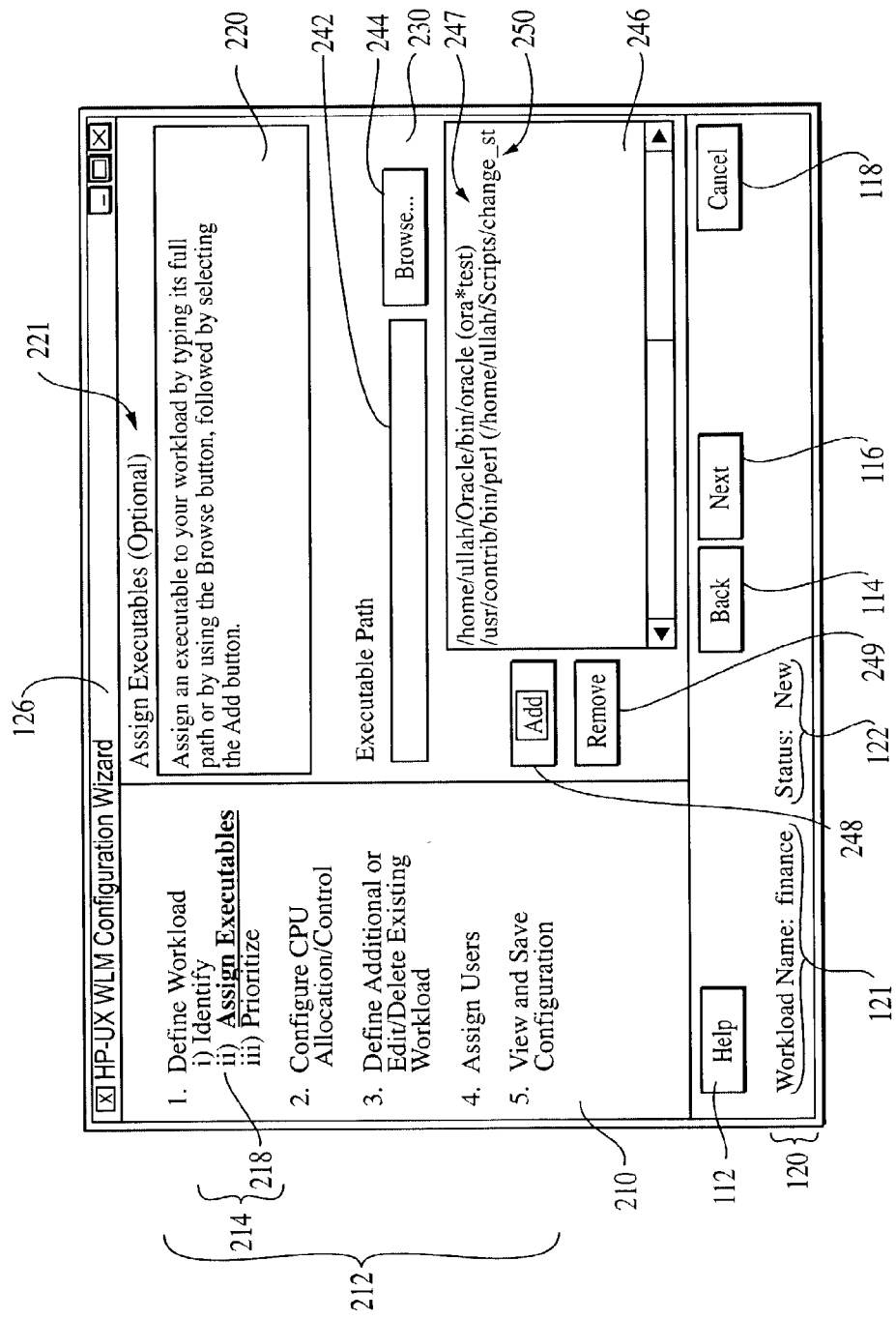

FIG. 7D shows the screen 126 of the GUI (60 in FIG. 1) shown in FIG. 7C, after the user has entered an additional executable path in the text box, "/home/ullah/Scripts/changed_stderr.pl." After entering the path name in the executable path text box 242, the user may associate the entered path with the workload ("finance") by selecting the "Add" button 248. FIG. 7E shows the screen 126 of the GUI (60 in FIG. 1) shown in FIGS. 7C and 7D, after the user has entered the executable path name in the executable path text box 242 and has associated the path with the workload ("finance") using the Add button 248. The path name entered in the text box 242 during the previous screen is now displayed as a path name 250 in the second text box 246 beneath the existing executable path 247, which was already associated with the workload ("finance"). In the example shown in FIG. 7E, the path name entered in the text box 242 is associated with a perl interpreter. In this example, the wizard (95 in FIG. 1) automatically identifies the perl interpreter associated with the executable path name entered by the user, and displays the perl script interpreter path in the text box 246, as shown by the text "/usr/contrib/bin/perl," in this example. Also in this example, the executable path name as entered in the executable path box 242 is also displayed in the second text box 246, in parentheses.

Figure 7F:
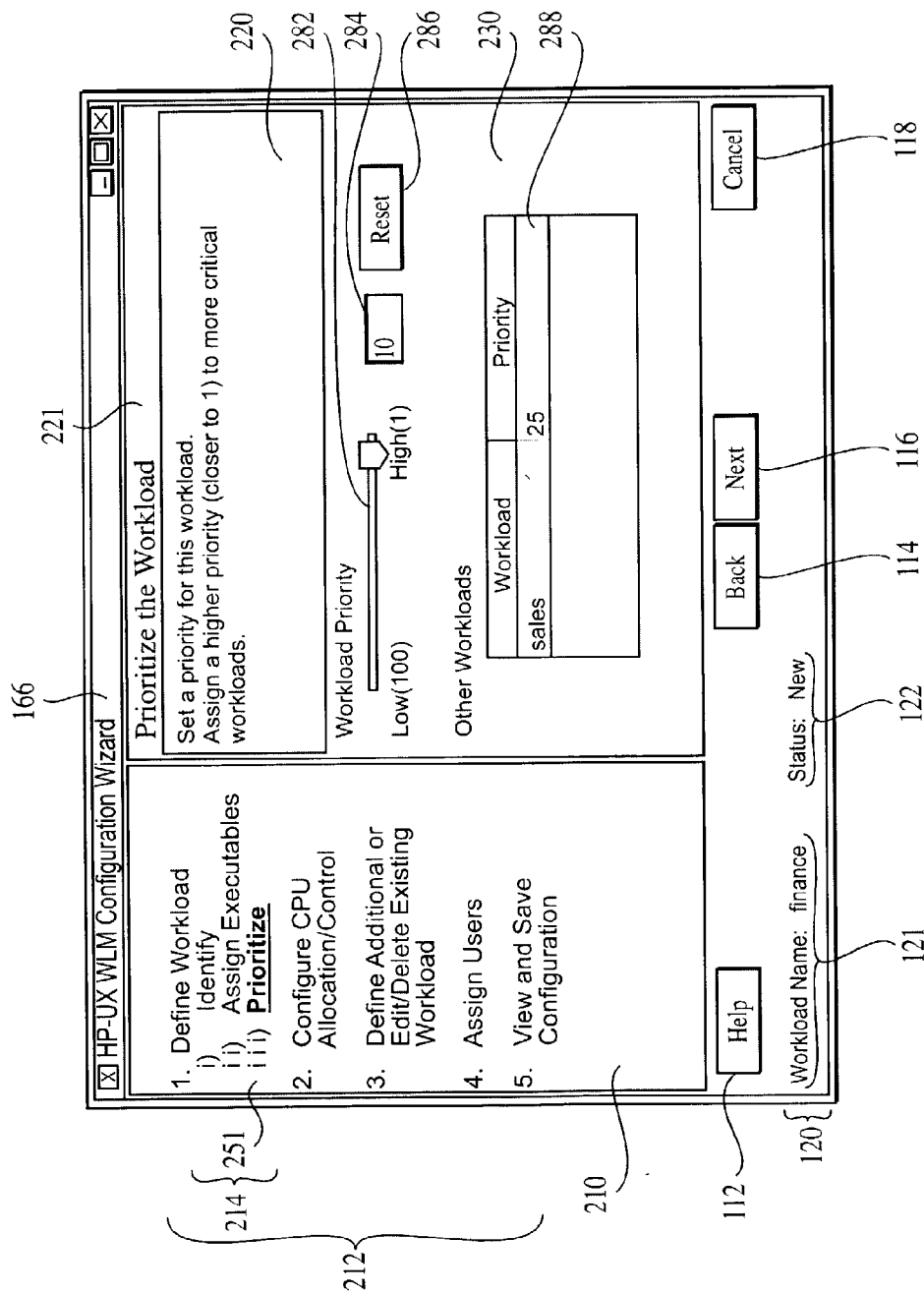

FIG. 7F shows another screen 166 used by the GUI (60 in FIG. 1) for the current step 251 of prioritizing the defined workload ("finance"). The example screen shown in FIG. 7F corresponds to the step of prompting the user to assign a priority level to the identified workload (block 453 in FIG. 5). As indicated by the text shown in the explanatory portion 220, the user is prompted to prioritize the current workload ("finance") by giving it a numerical value from 100 (low priority) to 1 (high priority) using a slider 282. The selected value is then displayed in a text box 284, or alternatively, the user can simply type the value in the text box 284. The input portion 230 also includes a reset button 286 for resetting the value of the workload priority to a default value, which is 50 in one example. In the example of FIG. 7F, the input portion 230 also includes a text box 288 that displays other workloads and their priorities so that the user can view the priorities of other workloads defined on the system (10 in FIG. 1) while setting the priority of the current workload ("finance"). In one example, the priority value may be used to allocate resources among workloads such that higher priority workloads are allocated CPU resources before lower priority workloads, subject to other specifications governing workload resource allocation.

Figure 8A:
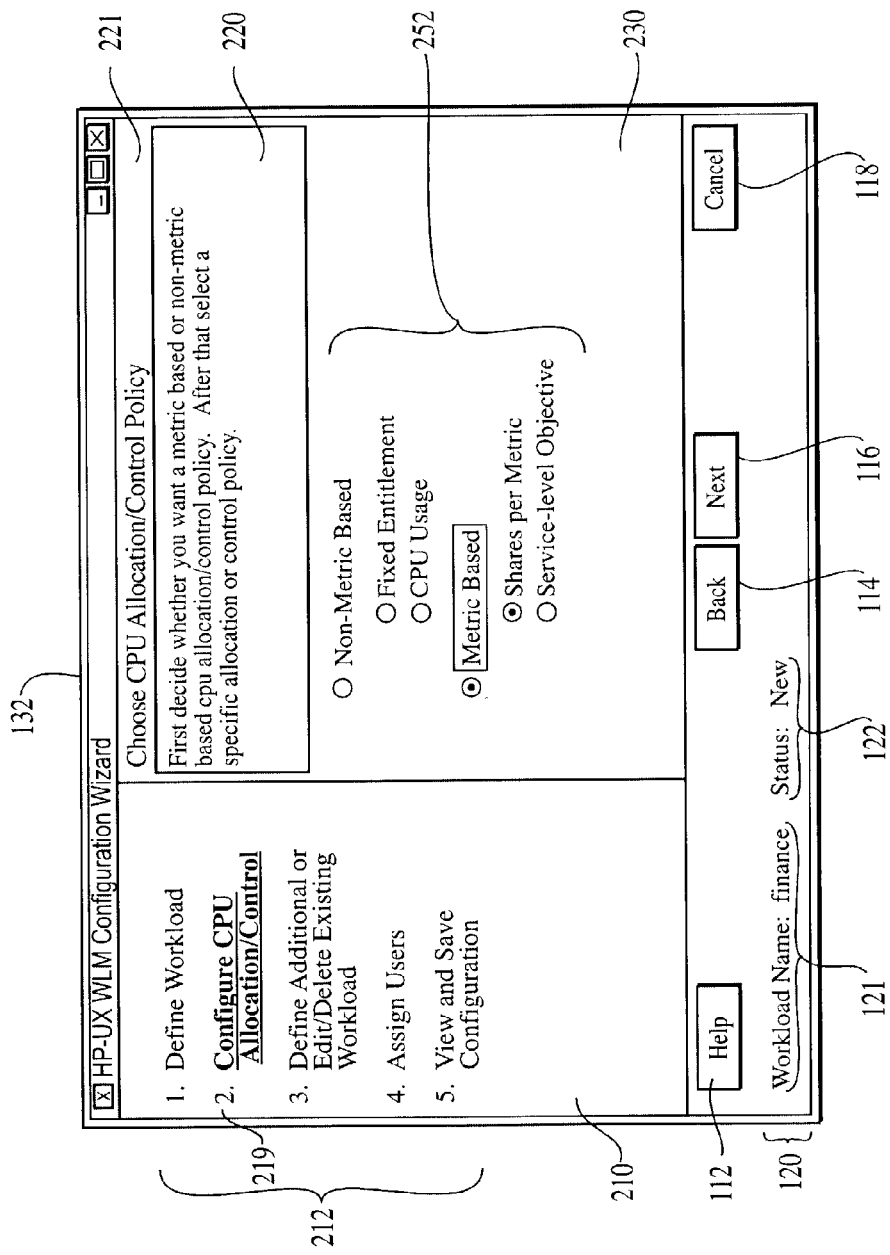
FIGS. 8A–8G are example input screens of the GUI used to configure a CPU allocation policy.

FIGS. 8A–8G show example screens of the GUI (60 in FIG. 1) corresponding to the step of prompting the user to specify a CPU resource allocation policy (block 412 in FIGS. 4 and 5). FIG. 8A shows an example screen 132 that prompts the user to select a type of policy for the current workload ("finance"). The example screen 132 shown in FIG. 8A is one embodiment of the step of prompting the user for a CPU resource allocation policy (block 454 in FIG. 5). As with the previous example screens, the configuration steps 212 are shown in the guide portion 210 of the screen 132. The current step 219 is indicated as such in the guide portion 210. In the example FIG. 8A, the user has just begun the step of configuring the CPU allocations/control policy, so the guide portion 210 has not yet displayed any sub-steps beneath the second step of configuring CPU resource allocation/control policy. Because the user has completed the first step of defining the workload ("finance"), the sub-steps (e.g., 214 in FIG. 7B) are no longer displayed beneath the define workload step in the configuration steps 212 of the guide portion 210.

In FIG. 8A, the title bar 221 and text in the explanatory portion 220 have been updated to refer to the current step 219. In the input portion 230, selection boxes 252 prompt the user to select a CPU resource allocation/control policy. This policy will govern how CPU resources are allocated to the current workload ("finance"). In the example in FIG. 8A, the input portion 230 prompts the user to select either a metric-based CPU resource allocation policy or a non-metric-based policy. A metric-based allocation policy allocates resources to the workload based on operating conditions during execution of the workloads. A metric may be a pre-defined parameter used by the computer system (10 in FIG. 1) to monitor performance of workload execution. By way of example, a metric may be a number of users logged into the system (10 in FIG. 1) or accessing the workload (40–43 in FIG. 1), or a metric may relate to a performance-based goal of a process or transaction performed by the workload.

If the user selects a non-metric-based policy then, in this example, the user is given the option of selecting either a fixed-entitlement policy or a CPU-usage policy, as also indicated by the corresponding steps 470, 472, 476 in FIG. 5. If the user selects a metric-based policy, then the user may select either a shares-per-metric policy or a service level objective policy in this example, as also shown in corresponding steps 460, 462, 467 in FIG. 5. In the example shown in FIG. 8A, the user has selected a metric-based policy and has selected a shares-per-metric policy, as indicated by the selection shown in the selection portion 252.

Figure 8B:
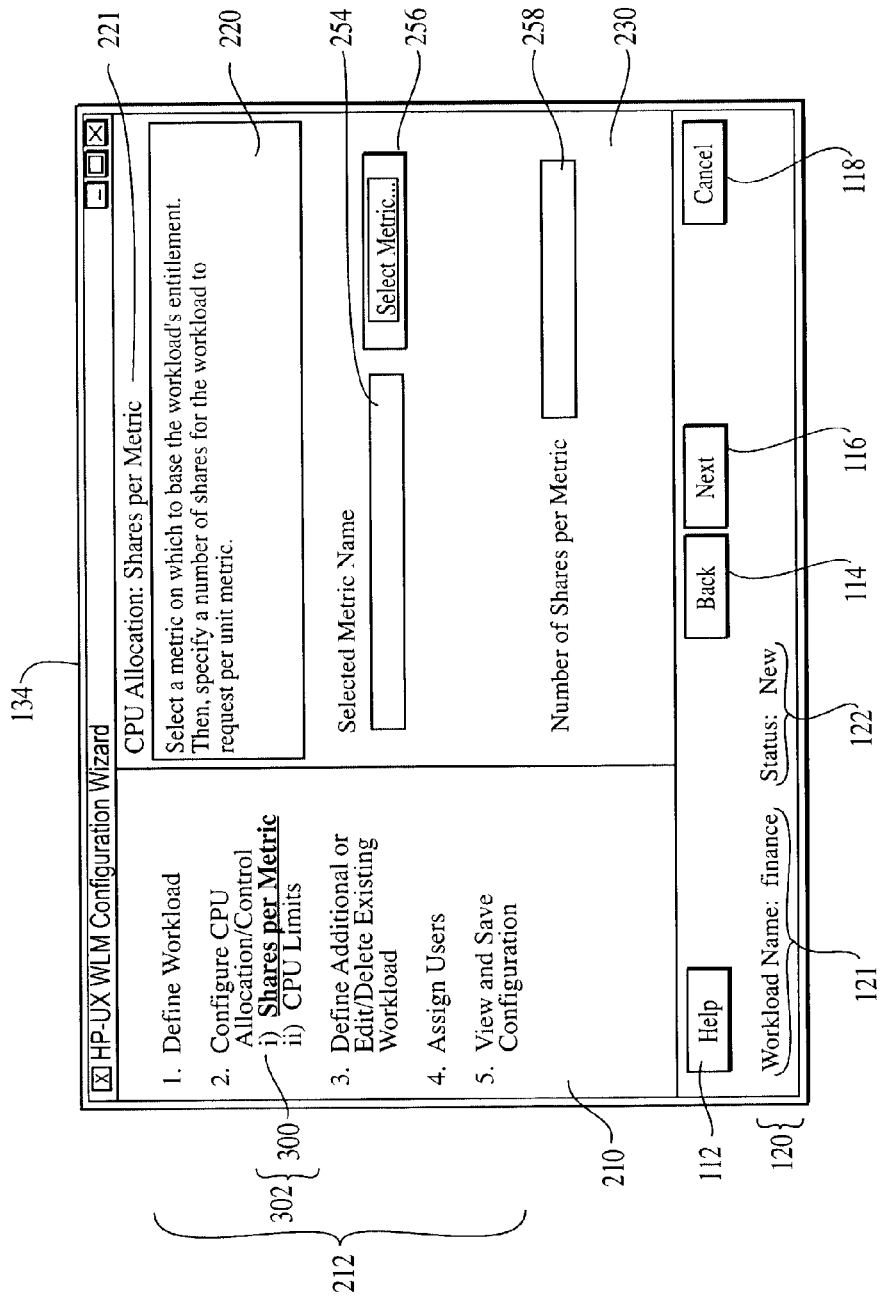
Figure 8C:
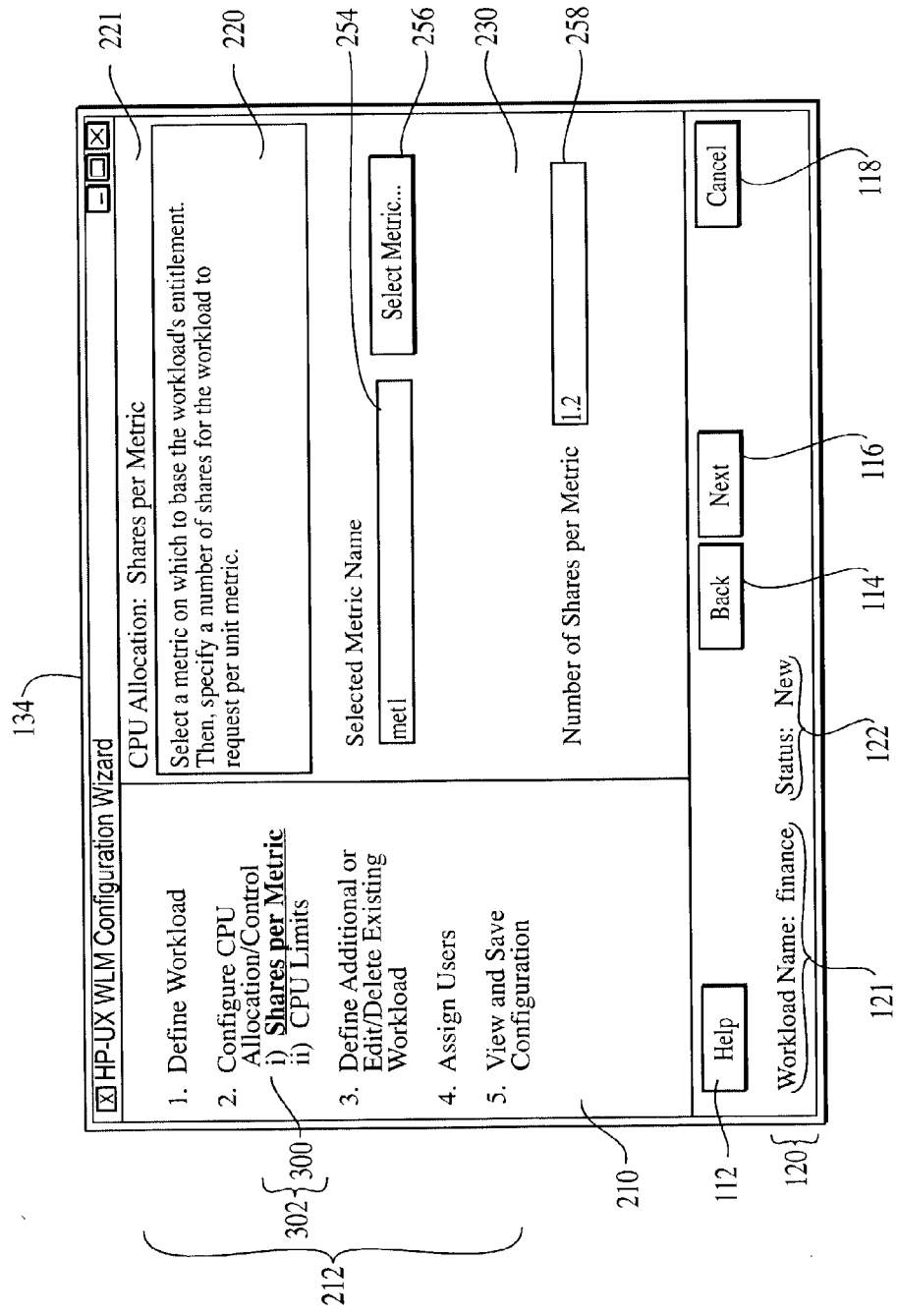
Figure 8D:
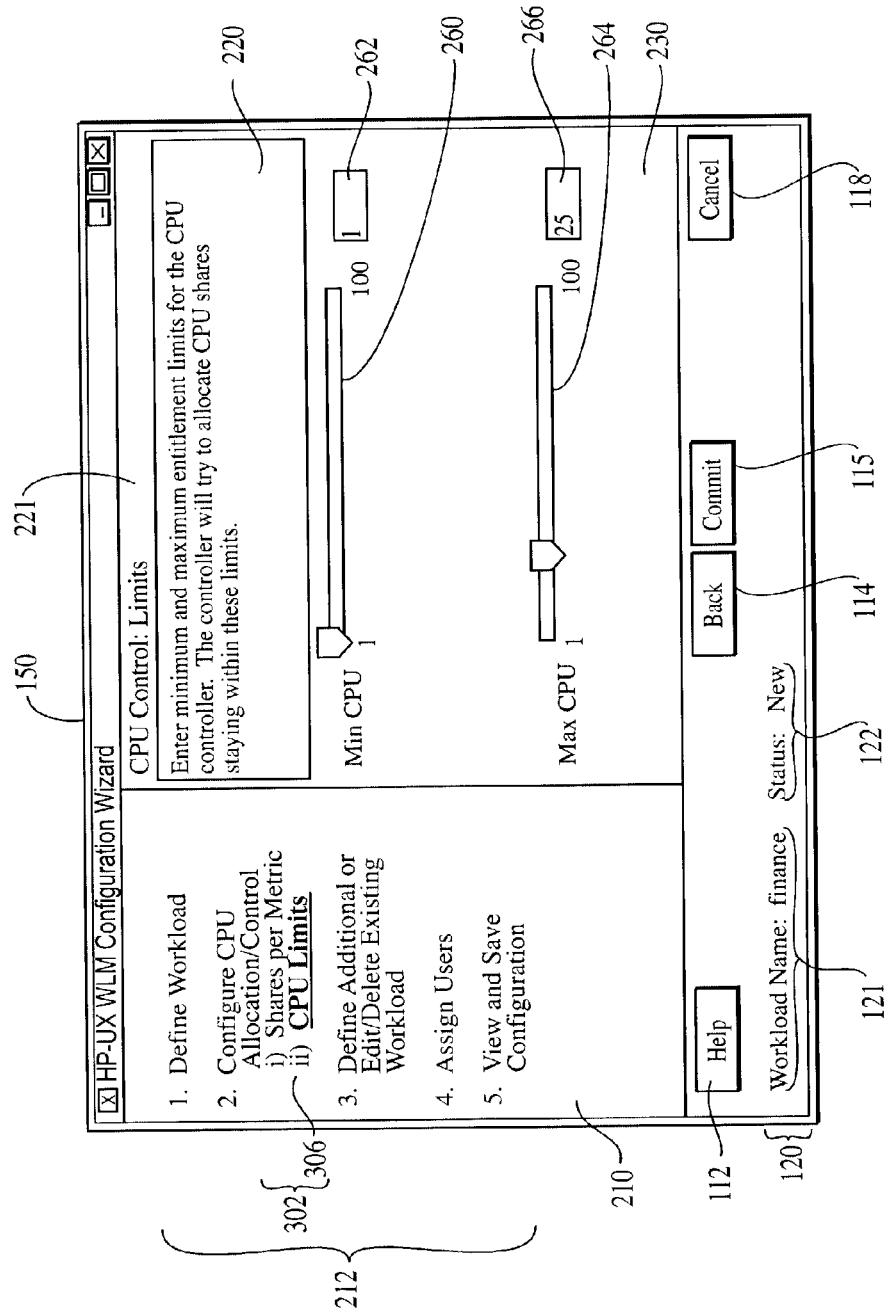

FIGS. 8B–D show example screens prompting the user for specifications for a shares-per-metric allocation policy (blocks 464, 466 in FIG. 5). FIG. 8B shows an example screen 134 in the GUI (60 in FIG. 1), after the user has selected the shares-per-metric, metric-based CPU allocation policy in the previous screen 132 shown in FIG. 8A, and has selected the next button (116 in FIG. 8A) to proceed. An example of a shares-per-metric allocation might include a metric based on a number of users logged into the computer system (10 in FIG. 1) or a number of logged-in users who are assigned to the specified workload ("finance"). In this example, it might be desirable to vary the workload's allocation of CPU resources based on the number of users, so that the workload is allocated proportionately more CPU resources as the number of users accessing the workload increases.

Sub-steps 302 have been expanded in the configuration steps 212 of the guide portion 210 of the screen 134, below the second step of configuring CPU allocation/control policy. The sub-steps 302 include the current step 300, which refers to a shares-per-metric selection. In the input portion 230 a text box 254 requests the user to enter a metric name. A "select metric" button 256 allows the user to browse through a listing of such metrics used by the computer system (10 in FIG. 1). In one example, the "select metric" button 256 invokes a metric sub-wizard, described herein with respect to FIGS. 14A–14D, to select a metric. A second text box 258 allows the user to specify the number of shares of CPU resources to be allocated to the workload on a per-metric basis. After entering the metric name and the number of shares-per-metric in the respective text boxes 254, 258, the user proceeds to the next screen using the next button 116. FIG. 8C shows substantially the same example screen 134 shown in FIG. 8B, after the user has selected the metric name "met1" for the text box 254 and has entered the number of shares-per-metric as 1.2 in the text box 258. The metric name "met1" may be entered using the "select metric" box 256 to involve a metric sub-wizard of the GUI (60 in FIG. 1), described herein with respect to FIGS. 14A–14D.

FIG. 8D shows a screen 150 in the GUI (60 in FIG. 1), also used as part of the configure CPU allocation/control policy step. The screen 150 relates to the current step 306 of specifying CPU limits for a shares-per-metric policy. In the sub-step 306 shown in FIG. 8D, the user is directed to specify minimum and maximum values for CPU allocation for the current workload as a percent of the total available resources, that is, from 1 to 100. The minimum and maximum values specified in the example of FIG. 8D are used to further limit allocation of CPU resources to a range. In the example of FIG. 8D, sliders 260, 264 are used to select CPU limits, and the selected limits are displayed in boxes 262, 266 in the input portion 230 of the screen 150. After the user has selected the minimum and maximum CPU limits, the user proceeds by selecting the "commit" button 115 in the lower portion of the screen 150, with the user input device (30 in FIG. 1).

Figure 8E:
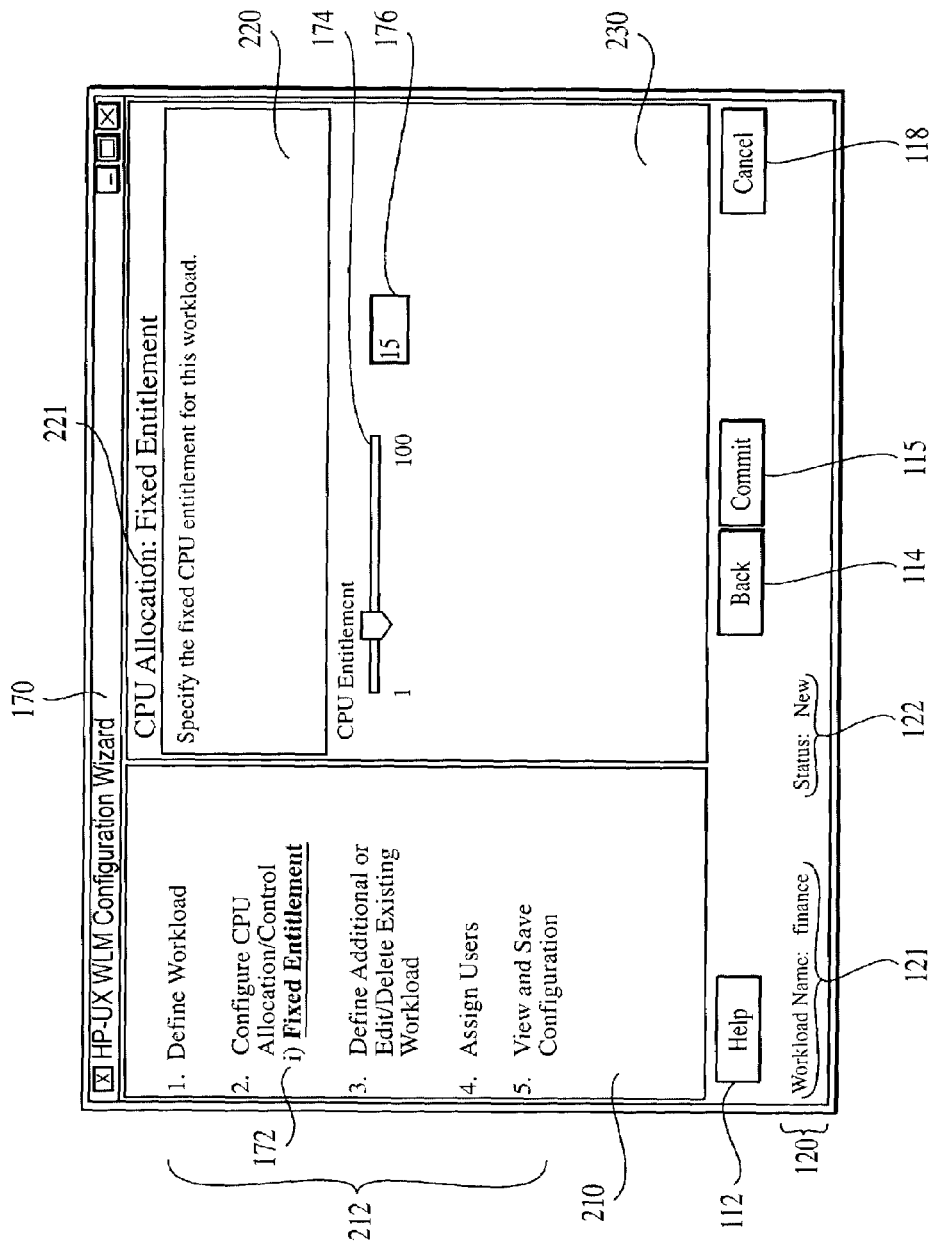
Figure 8F:
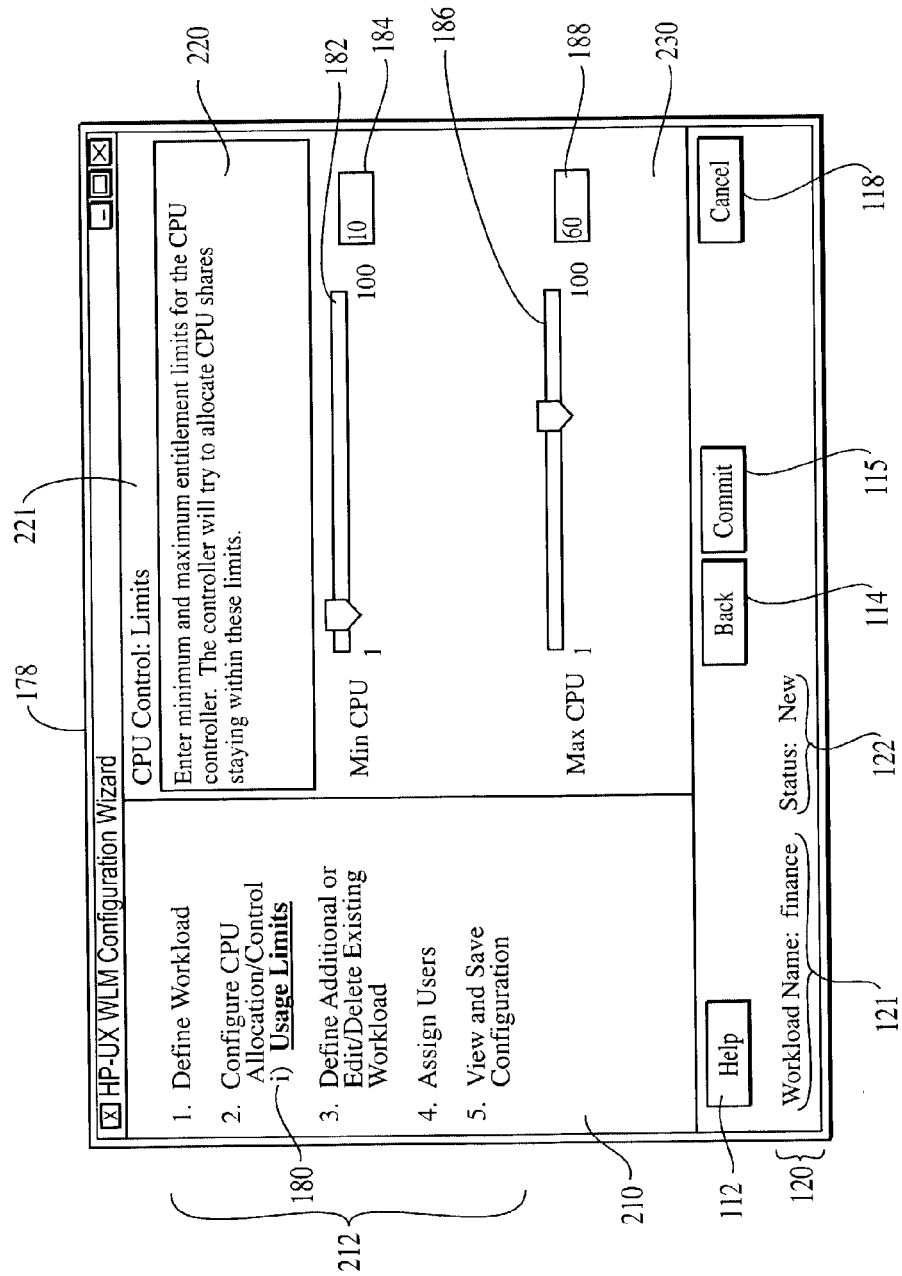
Figure 8G:
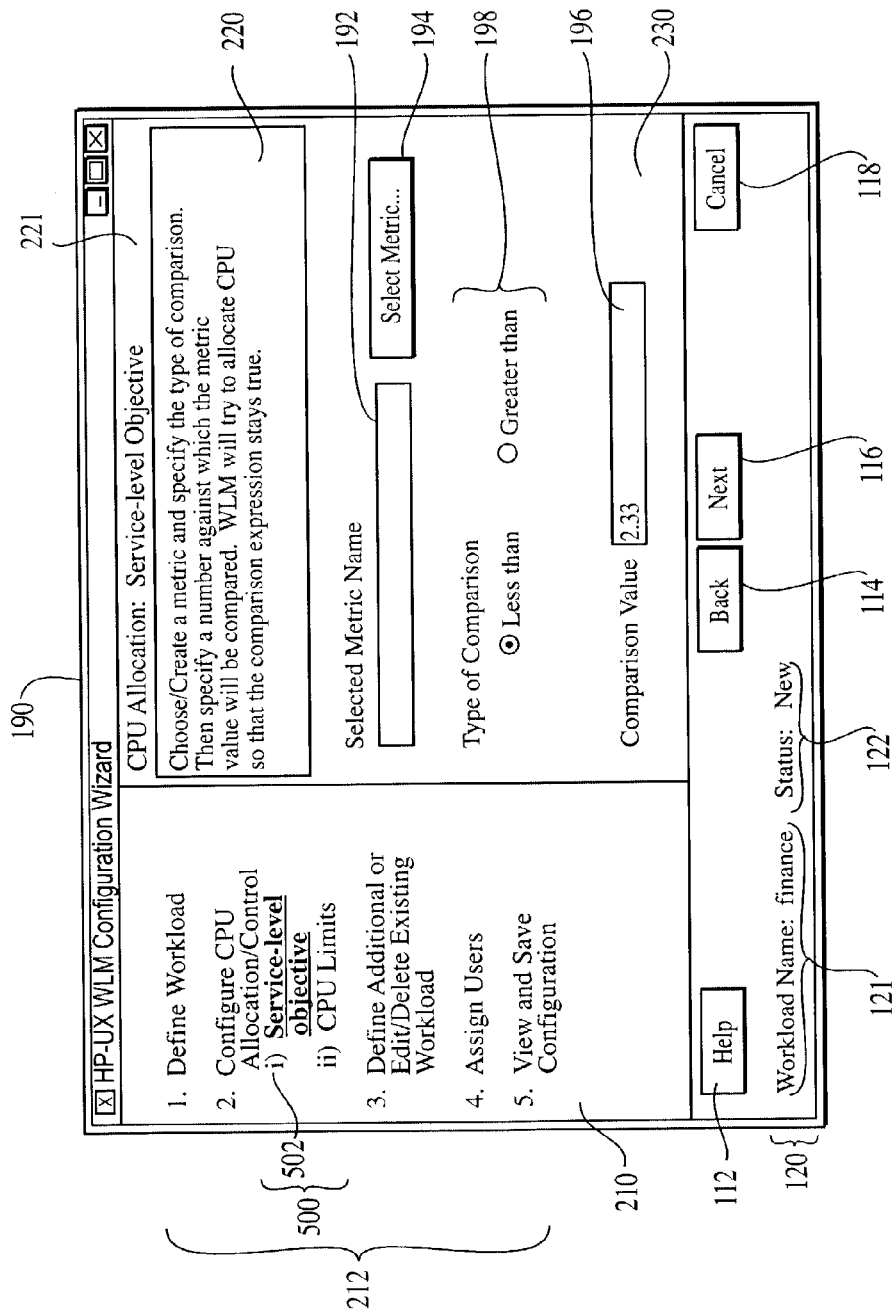

FIGS. 8E–8G show example screens 170, 178, 190 of the GUI (60 in FIG. 1), for configuring alternative CPU resource allocation policies. FIG. 8E shows an example screen 170 used by the GUI (60 in FIG. 1), which relates to the current step 172 of specifying a non-metric-based fixed-entitlement allocation of CPU resources for the workload. The example of FIG. 8E is one implementation of the step of prompting the user for a fixed-entitlement value (block 474 in FIG. 5). In this example, the user has reached the screen 170 shown in FIG. 8E by selecting the non-metric feature of a CPU allocation policy and has specified a fixed entitlement policy for the workload. A slider 174 located in the input portion 230 of the screen allows the user to select a fixed-entitlement value ranging 1 to 100. The selected entitlement is displayed in a text box 176, and in the example shown in FIG. 8E, the user has selected the value of 15 as the CPU entitlement. After selecting a CPU entitlement value, the user may select the commit button 115 to proceed to the next screen in the configuration process.

FIG. 8F shows an example screen 178 of the GUI (60 in FIG. 1) relating to a current step 180 of configuring the CPU allocation policy to a non-metric specification, based on usage limits. The screen shown in FIG. 8F is one example of an implementation of the step of prompting the user to enter minimum and maximum CPU usage values (block 478 in FIG. 5). The input portion 230 of the screen 178 includes sliders 182, 186 for specifying minimum and maximum CPU values, on scales expressed as a percentage of total CPU resources, ranging from 1 to 100. Text boxes 184, 188 show numerical values corresponding to the sliders 182, 186. In the example shown in FIG. 8F, the user has selected a minimum entitlement of 10 and a maximum entitlement of 60. These values will be entered the configuration file (90 in FIG. 1) and will be used by the resource allocator (70 in FIG. 1) to attempt to allocate resources within the specified range, depending upon the availability of CPU resources, the workload's actual usage, and according to the workload's priority relative to other workloads.

FIG. 8G shows an example screen 190 used by the GUI (60 in FIG. 1) relating to a current step 502 of configuring a CPU allocation policy to a metric-based policy associated with a service level objective. A service level objective, metric-based policy is a policy that attempts to allocate the workload sufficient CPU resources to achieve a goal, referred to as a service level objective. An example of a service level object, metric-based policy is a policy that monitors a metric corresponding to an average time required by the workload to complete a process or transaction. It might be desirable to ensure that a process undertaken by the workload is completed within a specified maximum time, if possible. The CPU resource allocation policy based on fulfilling a service level objective allocates resources to the workload to meet the time period specified.

The screen shown in FIG. 8G is one example of an implementation of the steps of prompting the user to enter a metric name and comparison value (468, 469 in FIG. 5). The service level objective configuration has two sub-steps 500, as displayed in the guide portion 210 below the second step for configuring the CPU allocation policy. The input portion 230 requests that the user enter a metric name in a text box 192 by selecting a metric from a list of available metrics, or by creating a new metric, using the "Select Metric" button 194. For the specified metric, the user selects a type of comparison from a selection portion 198 and specifies the value of comparison in a text box 196. In the example shown in FIG. 8G, the metric is yet unnamed, but the comparison specifies that the metric be less than 2.33. After the workload CPU resource allocation policy is configured, the GUI (60 in FIG. 1) displays a screen relating to the third step shown in the configuration steps 212 in the guide portion 210.

Figure 9A:
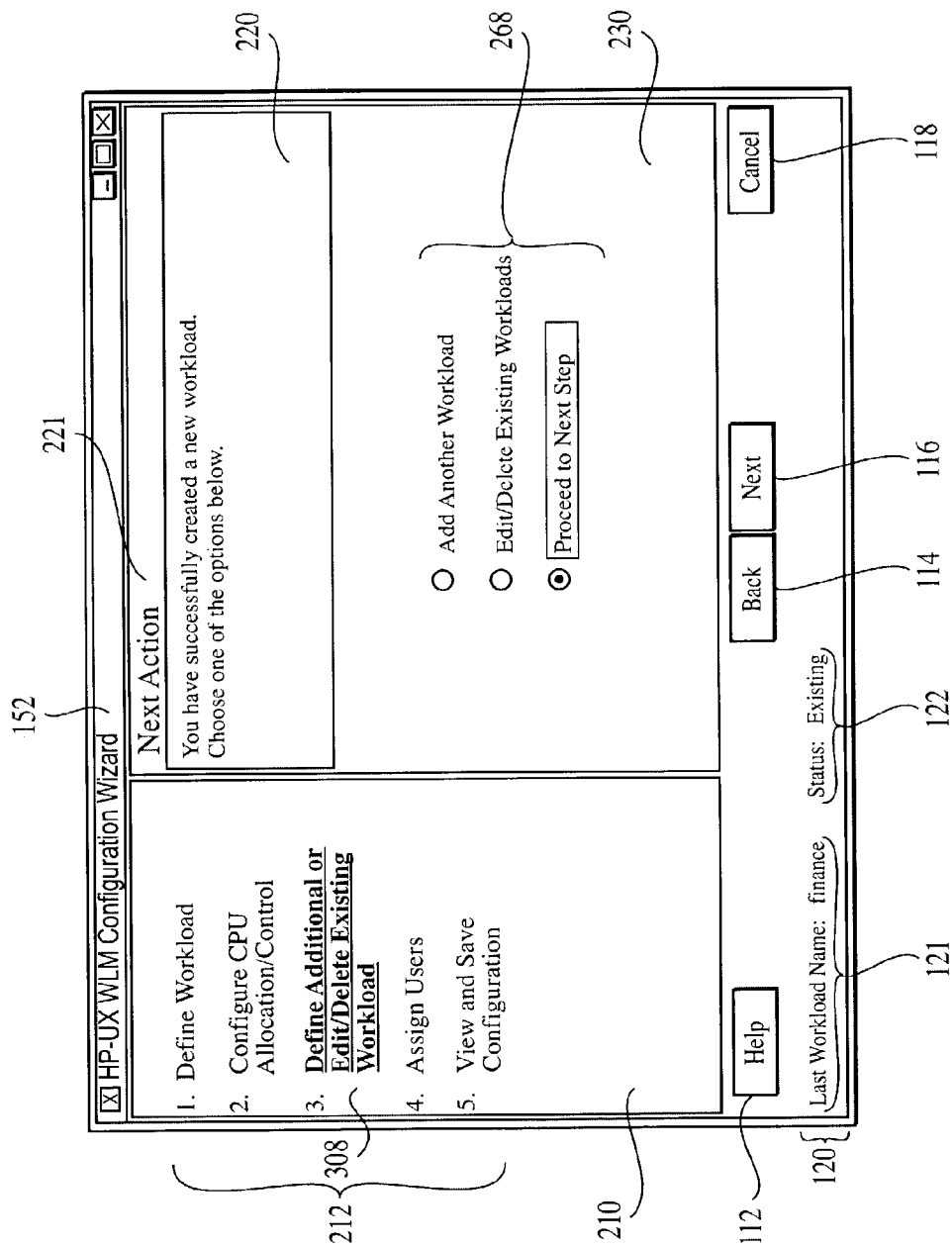
FIGS. 9A–B are example input screens of the GUI used to prompt the user to define additional workloads or edit or delete existing workloads.
Figure 9B:
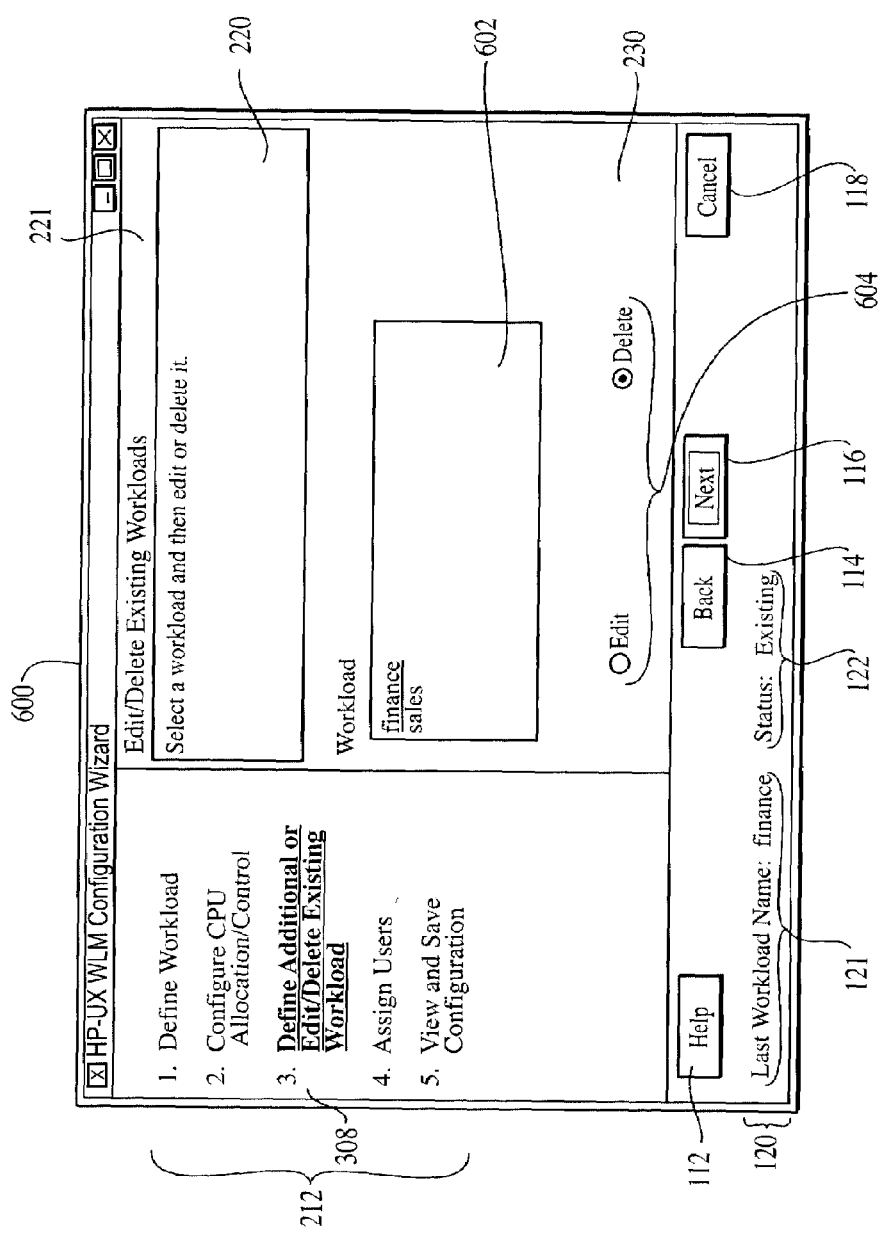

FIGS. 9A–9B show example screens of the GUI used to define additional workloads or edit or delete existing workloads. FIG. 9A shows an example screen 152 in the GUI (60 in FIG. 1) relating a current step 308 which allows the user to define additional workloads or to edit or to delete an existing workload. Because the user has already defined and configured a workload "finance," the status bar 120 has been updated to reflect the status 122 of the current workload ("finance") is no longer "new," but is now an "existing" workload. The embodiment shown in FIG. 9A is one implementation of the step of prompting the user for additional workloads to be entered (block 413 in FIG. 4). The input portion 230 of the screen 152 prompts the user with the options of adding another workload, deleting or editing an existing workload, or proceeding to the next step in the process, as shown by the selection portion 268. In the example shown, the user has selected the option to proceed to the next step in the configuration process.

FIG. 9B shows a screen 600 in the GUI (60 in FIG. 1) relating to the current step 308 of defining additional workloads. In the example of FIG. 9B, the user is prompted for information to edit or delete an existing workload (block 417 in FIG. 4). The user would view this screen if, for example, the user selected the "Edit/Delete Existing Workload" option from the selection portion in the previous screen (268 in FIG. 9A). The edit screen 600 includes a list 602 that displays names of existing workloads. The user selects one of the displayed workloads using the user input device and selects an option of either deleting or editing the selected workload from the selection portion 604. If the user selects the edit option, the wizard (95 in FIG. 1) loads the data specified for the selected workload (418 in FIG. 4) and restarts the process of displaying the series of GUI screens using the loaded data, as described with respect to FIGS. 7A–9A.

Figure 10:
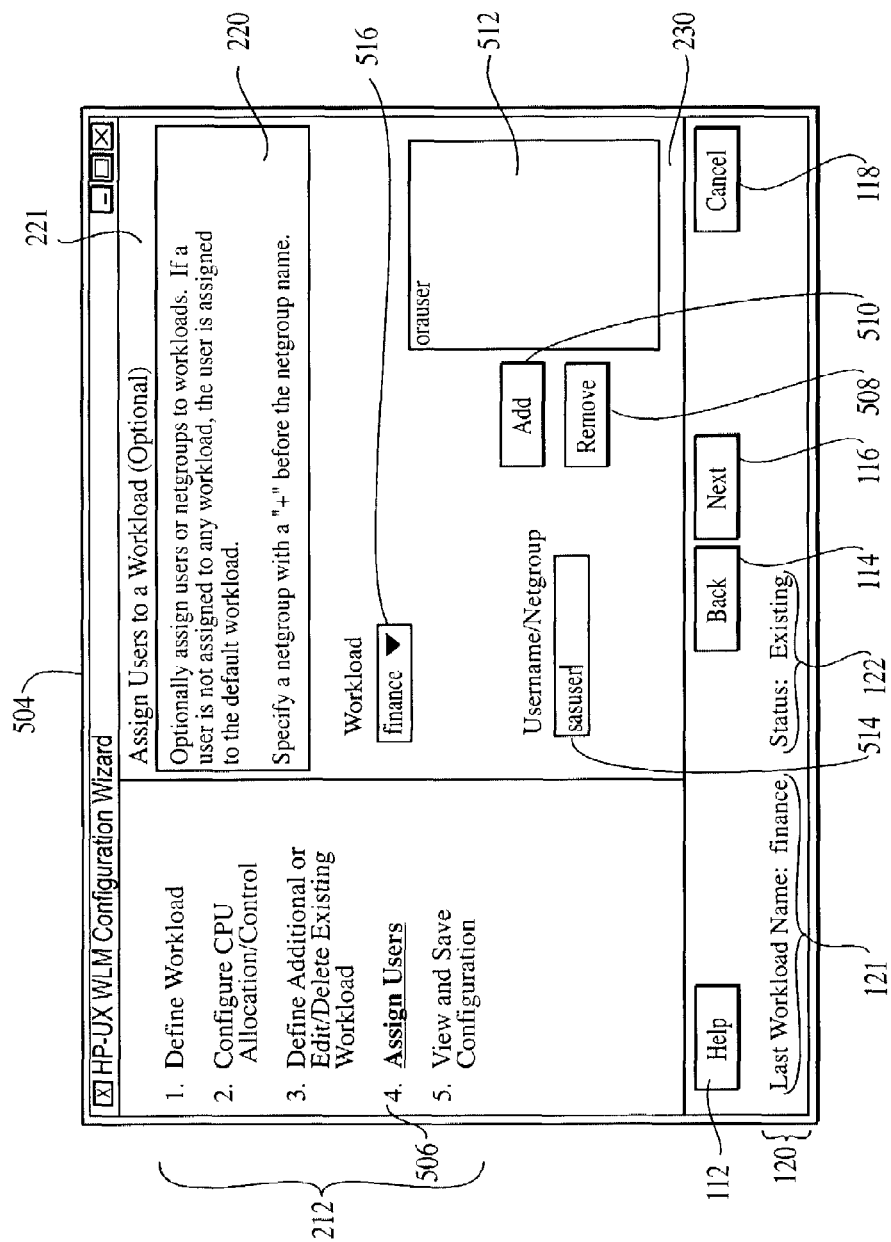
FIG. 10 is an example input screen of the GUI used to assign users to workloads.

FIG. 10 shows an example screen 504 of the GUI (60 in FIG. 1) relating to a current step 506 of assigning users to the workload. For various reasons, it may be desirable for the computer system (10 in FIG. 1) to automatically associate workloads with users or groups of users. For example, the system may want to know when a particular user begins using workloads, so that system resources may be reallocated to the workloads associated with the user. In the example of a shares-per-metric CPU resource allocation policy described above with respect to FIGS. 8B and 8D, the resource allocator (70 in FIG. 1) might allocate CPU resources to one or more workloads based on the number of users accessing the workload.

The input portion 230 includes a drop-down menu 516 of workload names. For each workload in the drop-down menu 516, the user may specify one or more users. Users may be added by entering their names or other identifiers in a text box 514 and using the "Add" button 510. Names or other identifiers of users (or groups of users) associated with the workload are displayed in a text box 512, and may be disassociated with the specified workload by selecting their listing in the text box 512 and using the "Remove" button 508. In the example of FIG. 10, the user "orauser" is already associated with the selected workload, "finance," as indicated by the name being displayed in the text box 512. The user has entered the name of an additional user, "sasuser," in the text box 514 and may associate user "sasuser" with the workload using the add button 510.

Figure 11:
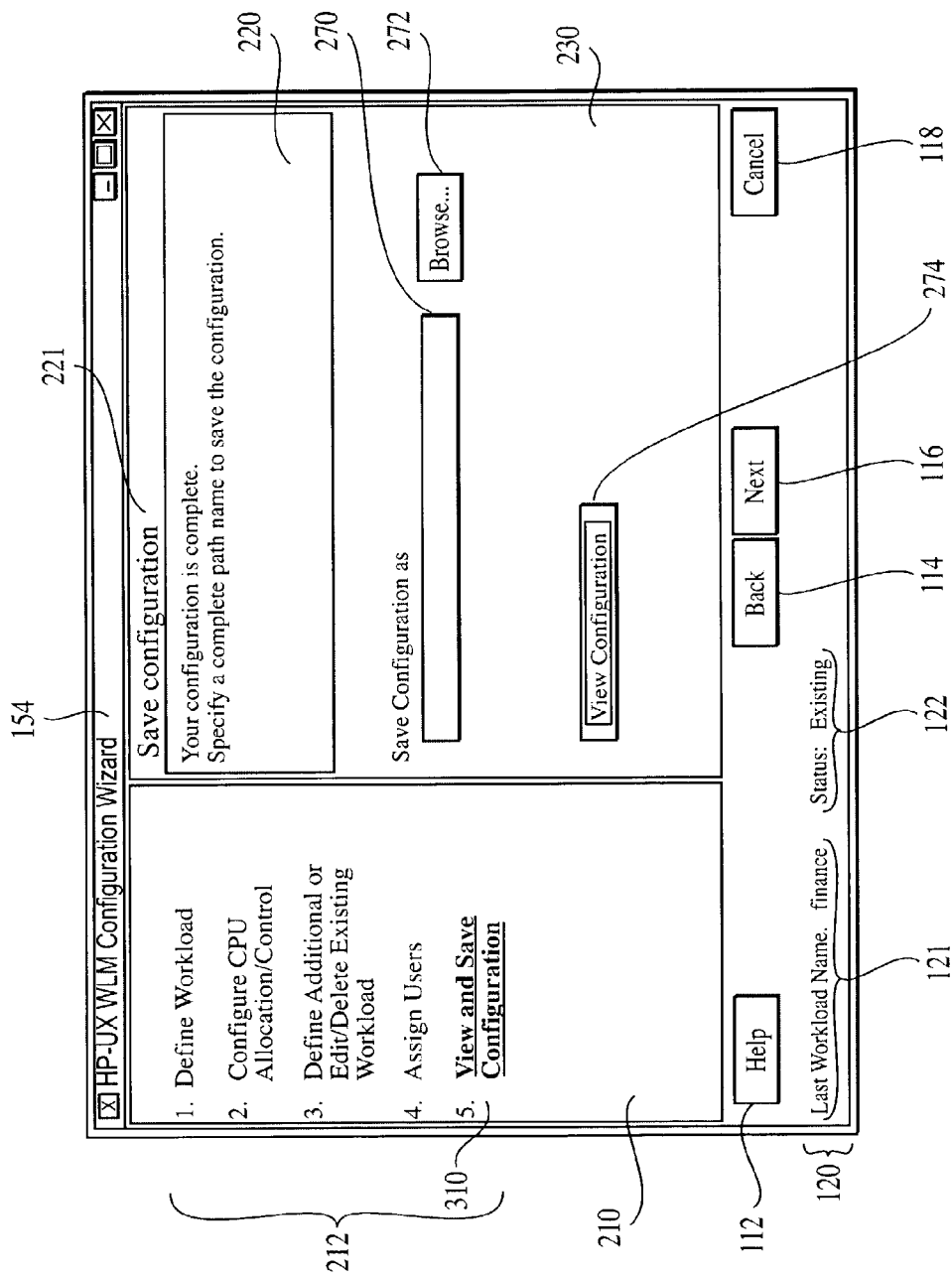
FIG. 11 is an example input screen of the GUI used to view and save the configuration file created by the wizard.

FIG. 11 shows an example input screen 154 used by the GUI (60 in FIG. 1) for the current step 310 of viewing and saving the configuration created using the wizard (95 in FIG. 1). In the example in FIG. 11, the GUI (60 in FIG. 1) prompts the user to enter a file name in a text box 270, under which name the configuration file (90 in FIG. 1) will be saved. A browse button 272 also allows the user to select an existing file name or view a list of existing files or directories. Before or after entering the configuration file name, the user may view the configuration file by selecting the "view configuration" button 274.

Figure 12:
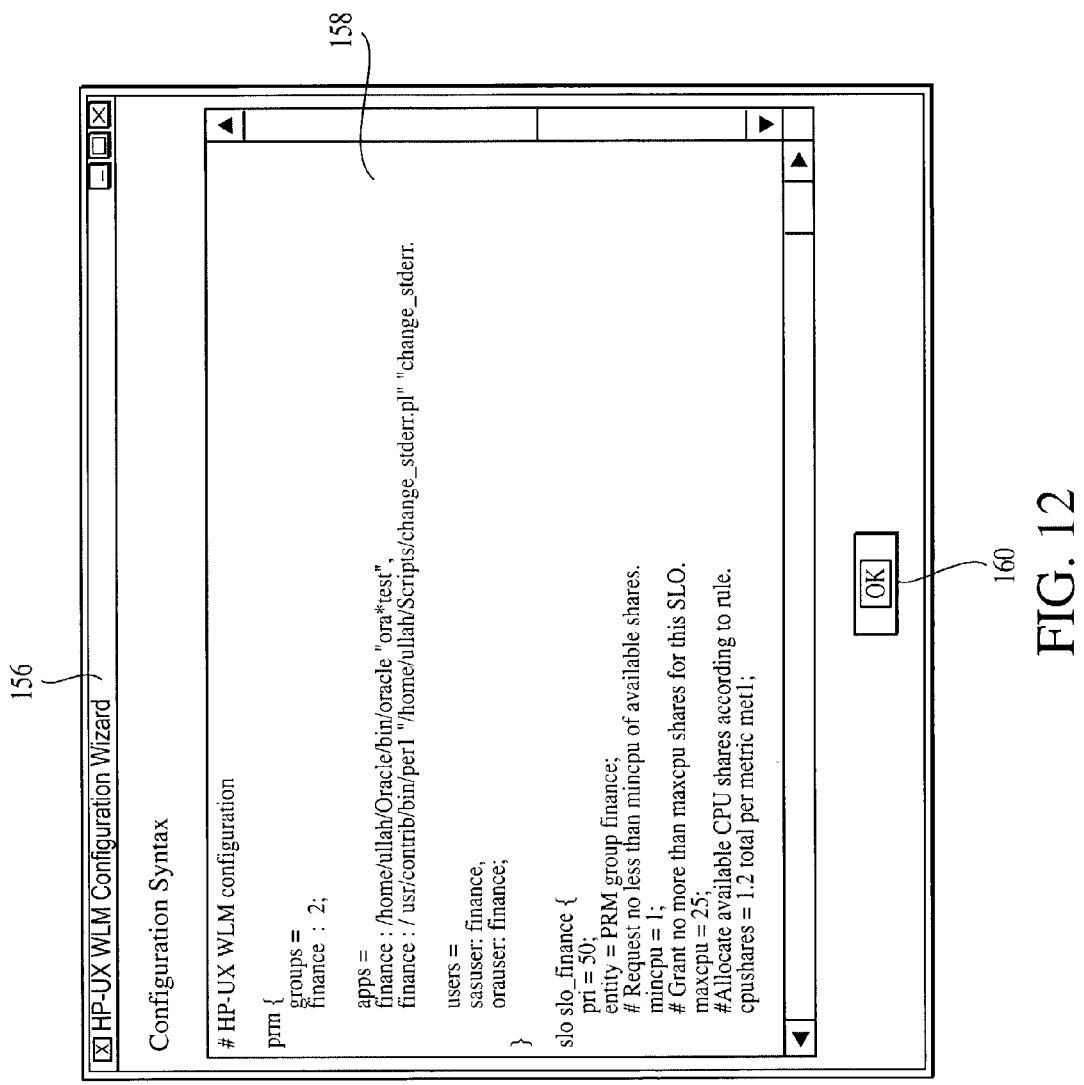
FIG. 12 is an example configuration screen of the GUI displaying the configuration file created using the wizard.

FIG. 12 shows a screen 156 used by the GUI (60 in FIG. 1) to display the configuration file (90 in FIG. 1) as created by the wizard (95 in FIG. 1). The screen includes a text area 158 that displays the text of the configuration file (90 in FIG. 1). The configuration file (90 in FIG. 1) includes the specifications entered by the user input device (30 in FIG. 1) in the input portions 230 of the input screens (e.g., 154), along with added syntax required by the resource allocator (70 in FIG. 1).

In one embodiment, the wizard (95 in FIG. 1) also adds explanatory comments in the configuration file (90 in FIG. 1) so that the user can more easily understand how the specifications are integrated into the configuration file (90 in FIG. 1). For example, after creating the configuration file (90 in FIG. 1) the user may want to change the resource allocations by simply editing the configuration file (90 in FIG. 1) directly, without using a wizard (95 in FIG. 1) to guide the user step-by-step through the configuration process. In this case, comments in the configuration file (90 in FIG. 1) assist the user in quickly locating the relevant portions of the code to be changed and in recognizing the use of syntax in the configuration file (90 in FIG. 1).

After viewing the configuration screen 156 the user may proceed to implement the configuration file (90 in FIG. 1) using the resource allocator in (70 in FIG. 1) by selecting the "OK" button 160. In one embodiment the user can only view the configuration file (90 in FIG. 1) by using the wizard (95 in FIG. 1), and cannot edit the configuration file (90 in FIG. 1) until after the wizard (95 in FIG. 1) is complete.

Figure 13:
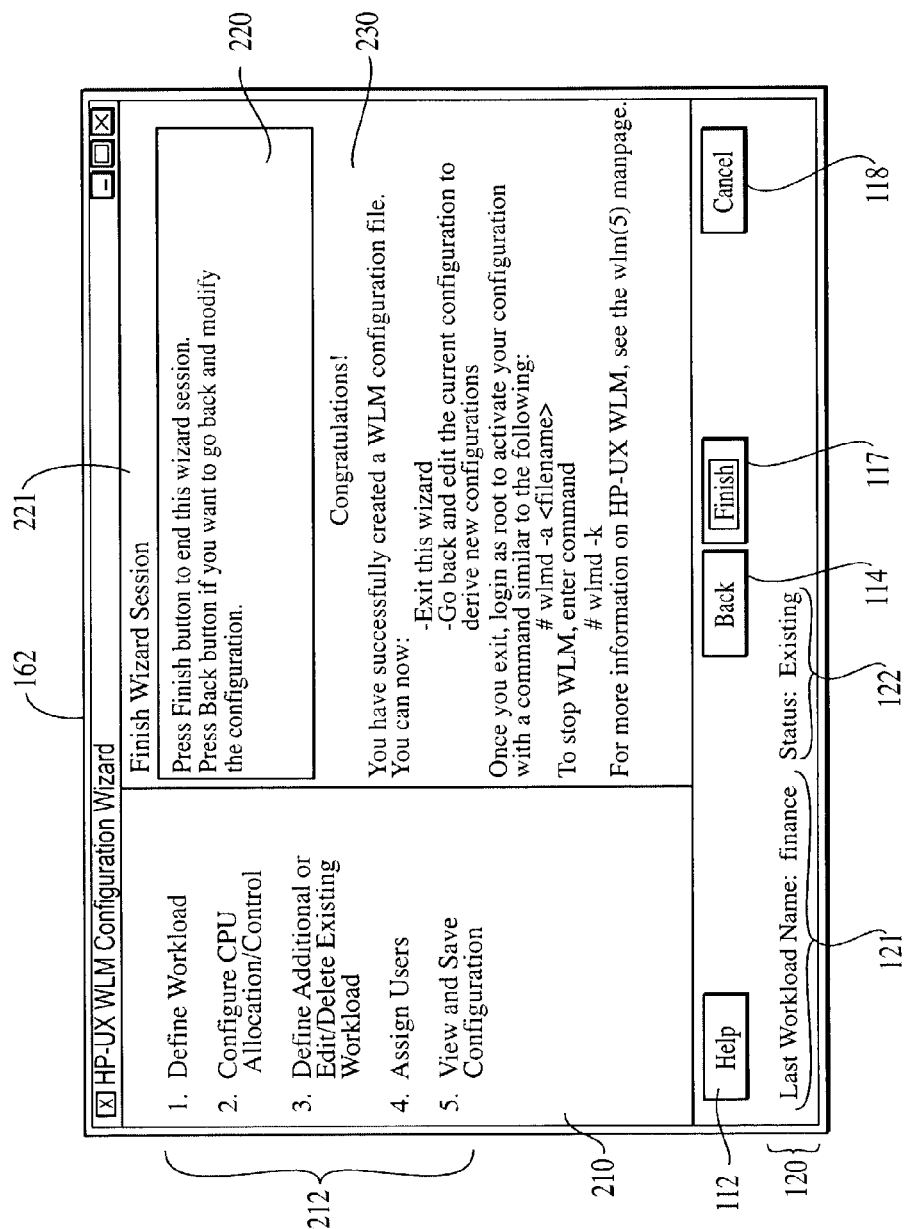
FIG. 13 is an example final screen of the GUI.

FIG. 13 shows a final screen 162 of one embodiment of the GUI (60 in FIG. 1). The final screen 162 provides information to the user as text displayed in the input portion 230 of the screen 162. This information indicates to the user how to activate and deactivate the configuration through the resource allocator (70 in FIG. 1). To complete use of the wizard (95 in FIG. 1), the user selects the "finish" button 117.

Figure 14A:
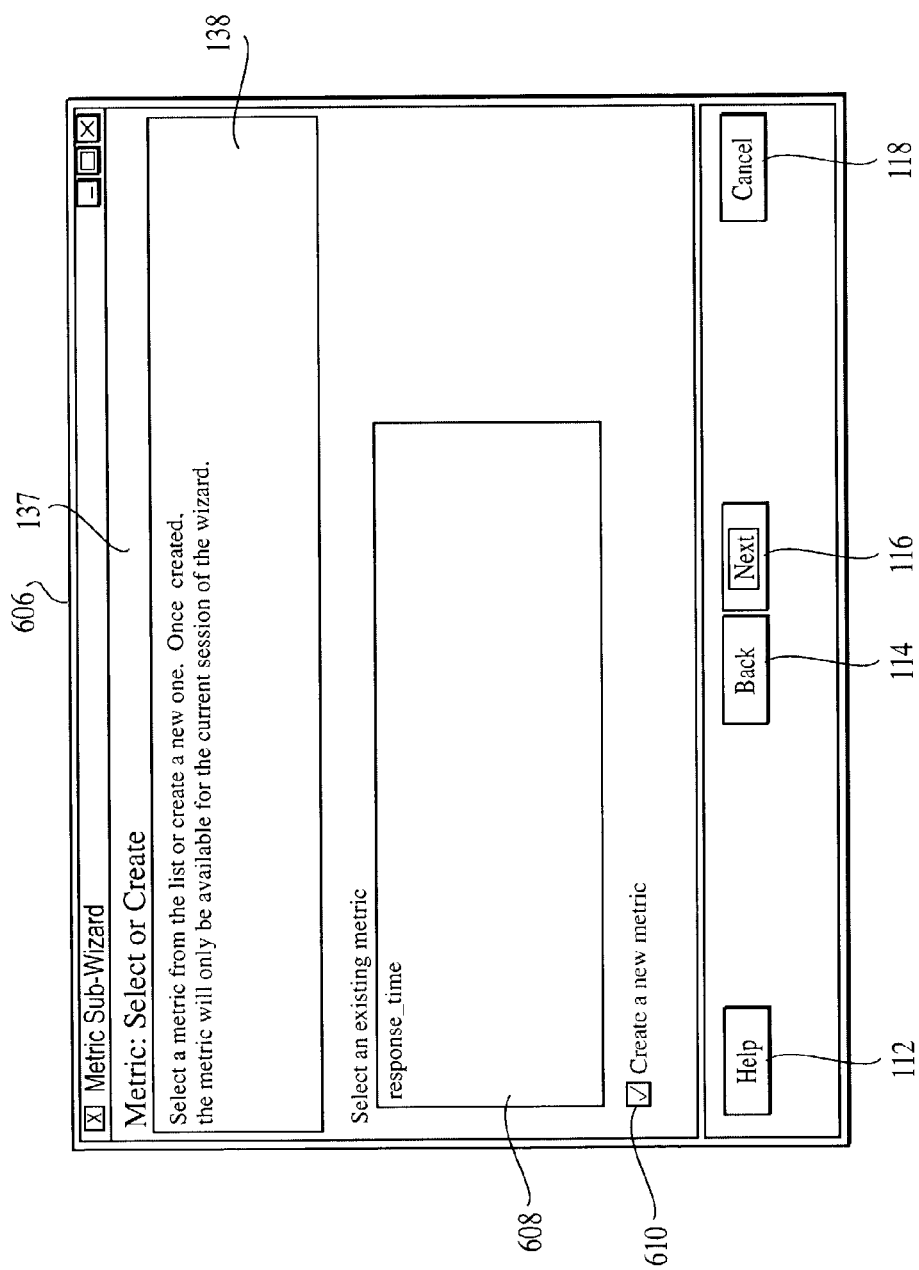
FIGS. 14A–14D are example screens of a metric sub-wizard of the GUI.

FIGS. 14A–14D show example screens 606, 136, 168, 612 of a metric sub-wizard of the GUI (60 in FIG. 1). The metric sub-wizard may be invoked in one embodiment by selecting a "select metric" button (e.g., 256 in FIG. 8B, 194 in FIG. 8G) in connection with specifying a metric-based CPU resource allocation policy. FIG. 14A shows a first metric sub-wizard screen 606 that is displayed. The screen 606 includes an explanatory portion 138 that displays information related to the data requested by the screen 606. The screen 606 includes a list 608 that displays one or more existing metrics that can be selected by the user. The screen also displays a create-new-metric box 610 that can be selected to allow the user to create a new metric, which the user has selected in the example of FIG. 14A, as indicated by the check mark. After making a selection, the user may proceed to the next sub-wizard screen by selecting the next button 116.

Figure 14B:
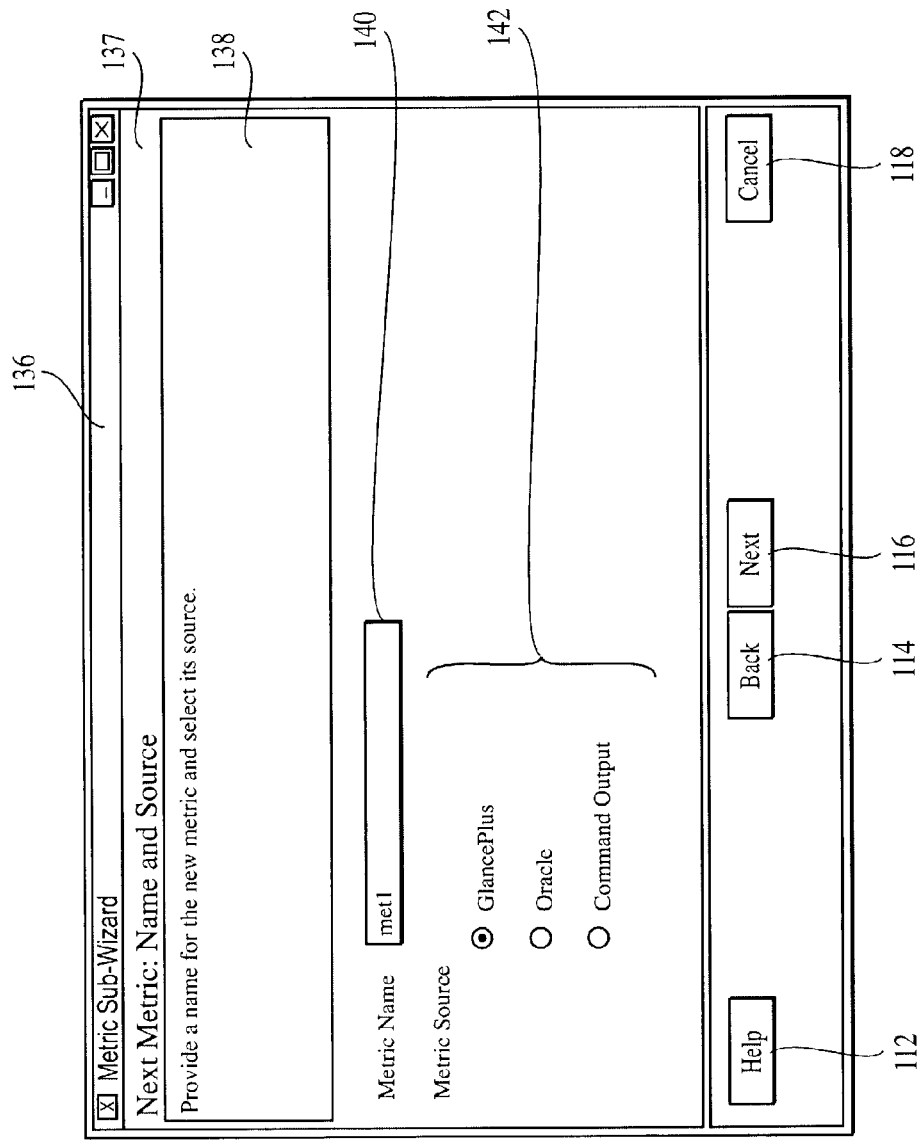

FIG. 14B shows a metric sub-wizard screen 136 that prompts the user to specify a name of a new metric in a text box 140 and to select the source of the metric from a selection portion 142. In the embodiment shown in FIG. 14B, the metric source may be selected among three choices: a GlancePlus product manufactured by Hewlett-Packard Company, an Oracle product manufactured by Oracle Corporation, or a command output from a user command. The metric sub-wizard screen 136 includes an explanatory portion 138 that displays text explaining to the user how to use the metric sub-wizard. These are examples of metric sources that may frequently be used by some users, and are included specifically for the user's convenience. The sub-wizard screen 136 also includes a title bar 137, which in the example shown in FIG. 14B, shows the title for creating a new metrics name and source. To proceed to the next screen in the metric sub-wizard, the user selects the next button 116.

Figure 14C:
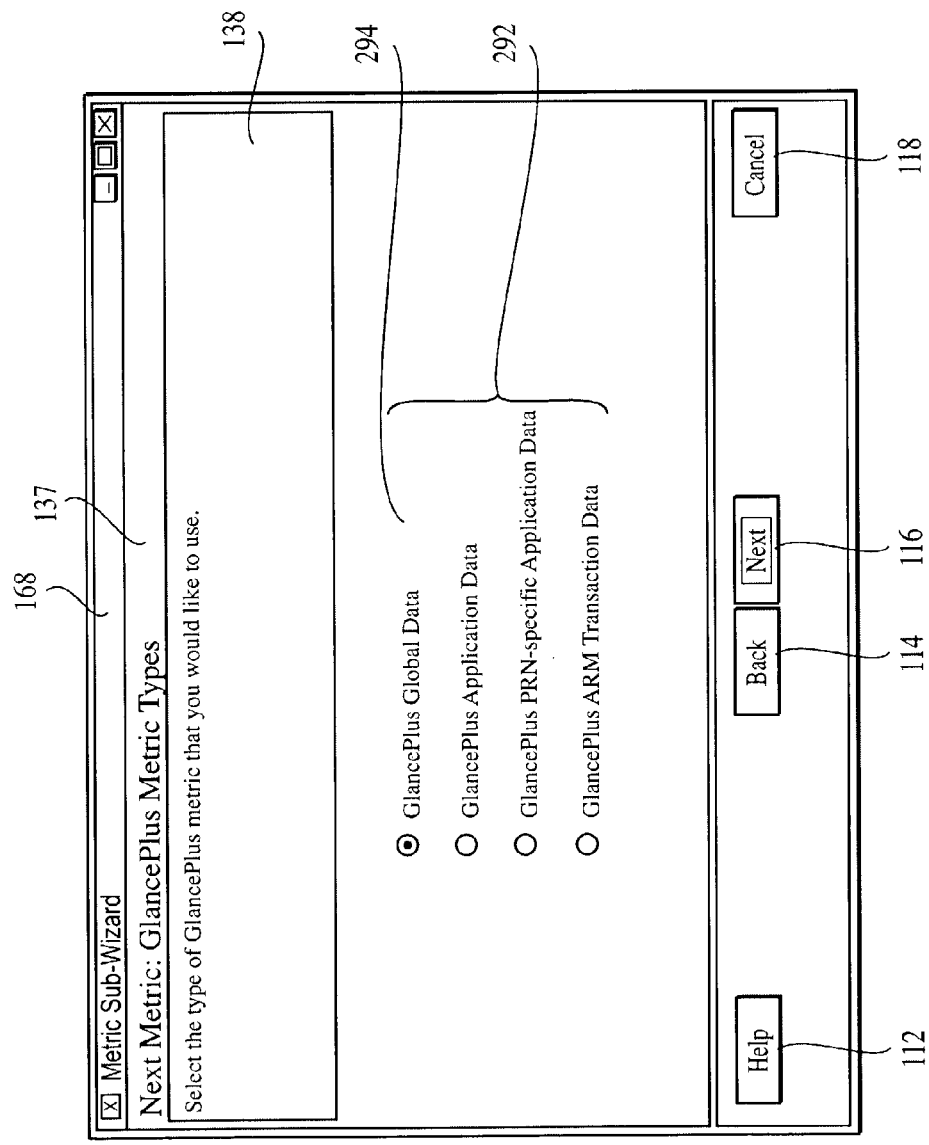

FIG. 14C shows another screen 168 of the metric sub-wizard. In the example of the previous screen shown in FIG. 14B, the user selected the GlancePlus option as the metric source from the selection portion 142 and selected the next button (116 in FIG. 14B). The screen of 168 of the metric sub-wizard shown in FIG. 14B requests the user enter additional information regarding the source of the glance plus metric. The user may select from a selection portion 294 of an input portion 292 of the screen. In the example shown in FIG. 14C, the user is given four GlancePlus metric options from which to choose. Those options includes global data, application data, PRM-specific application data, and ARM-transaction data. These are all metrics that are defined in the glance plus program. The screen 168 of the metric sub-wizard shown in FIG. 14C also includes an explanatory portion 138 that provides text information related to the information requested in the input portion 292 of the screen 168. The sub-wizard also includes a title bar 137, which has been updated to refer specifically to the GlancePlus metric types.

Figure 14D:
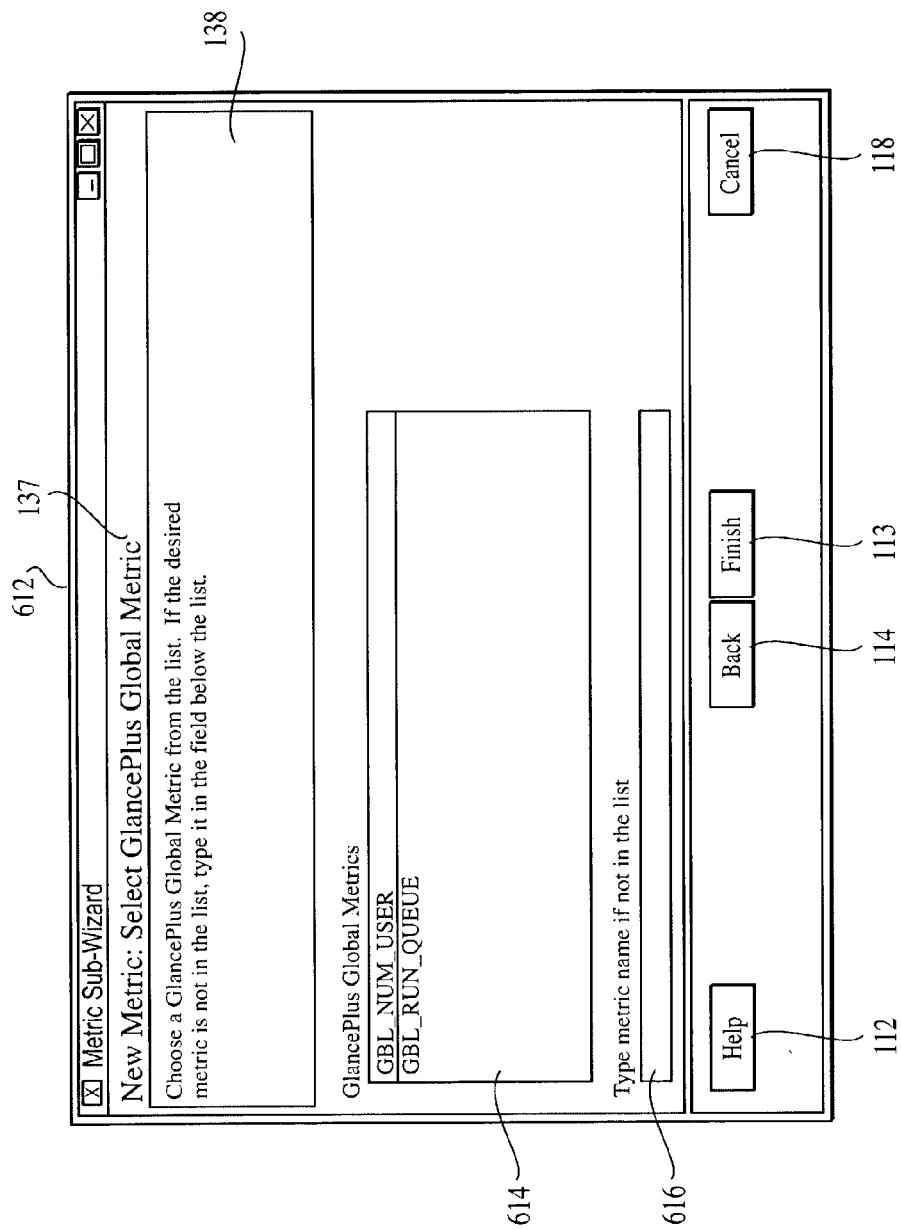

FIG. 14D shows a fourth screen 612 in the metric sub-wizard, which displays a list of metrics available in the GlancePlus system in a text box 614. The user may select one of the metrics shown, or may specify another existing metric by typing a metric name in the text box 616. The wizard (95 in FIG. 1) then attempts to locate the unlisted metric on the computer system (10 in FIG. 1).

In the example of FIG. 14D, the metric sub-wizard is complete when the user has selected the type of GlancePlus metric in FIG. 14C and has selected the global metric "GBL_NUM_USER" from the list in the text box 614. To return to the configuration wizard (95 in FIG. 1), the user selects a finish button 113 after selecting the metric. The metric sub-wizard screen 136 also includes a cancel button 118 for exiting the sub-wizard and a help button 112 for accessing help features associated with the metric sub-wizard.

Figure 15A:
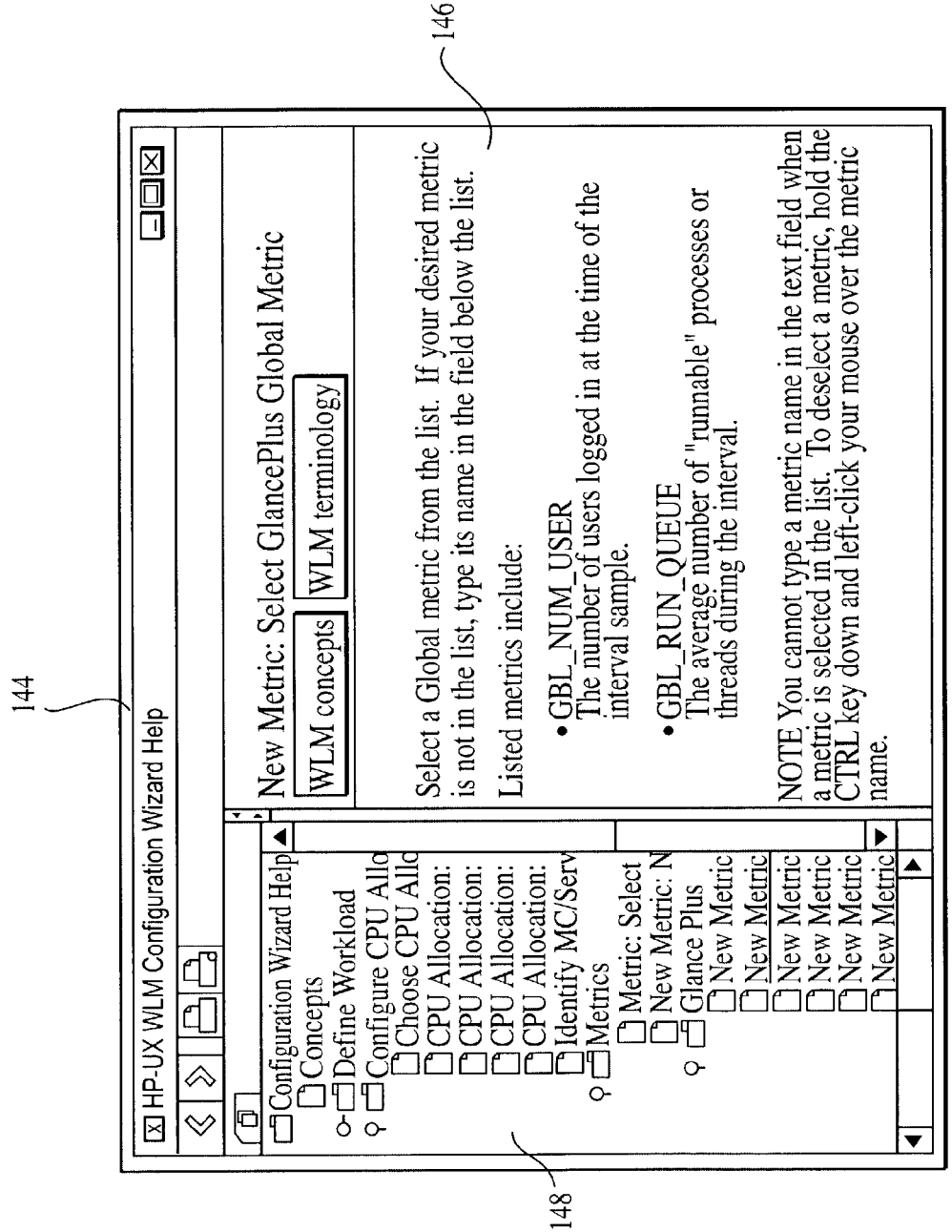
FIGS. 15A–15B are example help screens of the GUI.
Figure 15B:
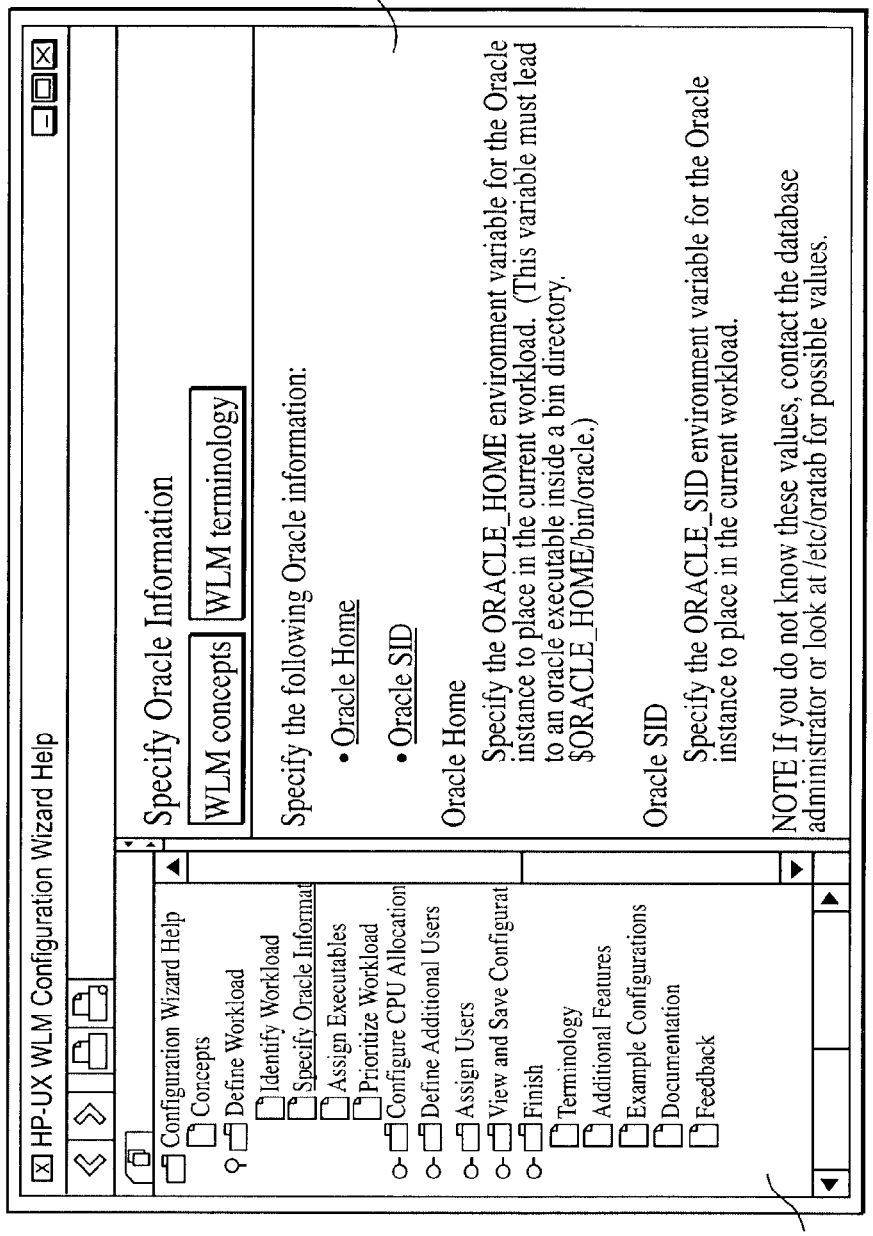

FIGS. 15A–15B show example help screens used by the GUI. FIG. 15A shows a help screen 144 of the GUI (60 in FIG. 1), which may be invoked at various stages of the wizard operation using the help button 112 displayed on the screens of the GUI (60 in FIG. 1). The help screen 144 includes a guide portion 148 that lists help topics organized in a tree structure, such that related topics are grouped under broader topics to which they relate. The help screen 144 also includes an information portion 146 located to the right of the guide portion 148. The information portion 146 displays help information for an item or a topic selected from the guide portion of the help screen 144.

Although the present invention has been described with respect to particular embodiments thereof, variations are possible. The present invention may be embodied in specific forms without departing from the essential spirit or attributes thereof. In particular, although the present invention has been described with respect to specific embodiments customized to the WLM, GlancePlus, Oracle, and other products, one skilled in the art will recognize that the present invention is not limited to any particular resource allocator, resource management product, database, or any other product. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or read-only memory (ROM). It is desired that the embodiments described herein be considered in all respects illustrative and not restrictive and that reference be made to the appended claims and their equivalents for determining the scope of the invention.

The invention claimed is:

1. A method of creating a configuration file for use with a resource allocator that allocates central processing unit (CPU) resources among workloads operating on a computer system, the method comprising:

displaying, as part of a graphical user interface (GUI), a prompt for specifications for workloads operating on the computer system, which specifications comprise, for each workload, a definition and a CPU resource allocation policy;

receiving the specifications from a user input device; and creating a configuration file for allocating the CPU resources to each of the workloads based on the CPU resource allocation policies associated with each of the defined workloads, wherein the prompt for specifications includes a prompt for defining a workload and for assigning a user to the defined workload.

2. The method of claim 1, further comprising allocating CPU resources to the defined workloads based on the configuration file, using a resource allocator to dynamically allocate the CPU resources to the workloads while the workloads operate on the computer system.

3. The method of claim 1, wherein the step of displaying a prompt comprises displaying a plurality of linked input screens as part of the GUI, which input screens guide a user through steps of a process that creates the configuration file.

4. The method of claim 3, wherein the step of displaying the input screens comprises displaying on each of the input screens:

an input portion that prompts the user to enter the specifications;

a guide portion that displays the steps in the process and indicates a current step for which the user is prompted in the input portion; and an explanatory portion that displays information related to the specifications requested in the input portion.

5. The method of claim 4, wherein the guide portion displays steps comprising:

a step for defining the workload;

a step for configuring the CPU resource allocation policy for the defined workload; and a step for assigning the user to the defined workload; and wherein the step of displaying the input screens comprises:

displaying a screen related to the step for defining a workload;

displaying a screen related to the step for configuring the CPU resource allocation policy; and displaying a screen related to the step for assigning a user.

6. The method of claim 4, wherein the step of displaying the input screens comprises displaying the plurality of linked input screens that prompt the user for specifications of the CPU resource allocation policy, which plurality of input screens prompt the user to specify either a metric-based policy or a non-metric-based policy.

7. The method of claim 6, wherein the step of receiving the specifications comprises receiving specifications of the CPU resource allocation policy in response to the displaying of the linked input screens that prompt the user for specifications of the CPU allocation policy, and further comprising, if the user has selected a metric-based policy, displaying one or more screens of a metric sub-wizard, which sub-wizard prompts the user to identify a metric that is used to allocate the CPU resources.

8. A computer-implemented graphical user interface (GUI) for prompting a user to enter specifications used to create a configuration file for allocating computer system resources among a plurality of workloads, the GUI comprising:

a plurality of linked input screens associated with a plurality of steps in a process for creating a configuration file used to allocate central processing unit (CPU) resources among a plurality of workloads executing on a computer system, which input screens display prompts for specifications for allocation of the CPU resources, each of the input screens comprising an input portion that prompts the user to enter the specifications;

a guide portion that displays the steps in the process, and indicates a current step for which the input portion prompts the user to enter the specifications; and an explanatory portion that displays information related to the current step, wherein the input screens comprise one or more input screens that receive specifications for defining a workload and associating the defined workload with a CPU resource allocation policy and the input screens further comprise one or more input screens that receive specifications to associate a user with the workload.

9. The GUI of claim 8, further comprising: an introductory screen linked to at least one of the input screens, which introductory screen displays information related to the process for creating the configuration file; and a final screen linked to at least one of the input screens, which final screen displays information related to use of the configuration file.

10. The GUI of claim 8, further comprising a help screen linked to each of the input screens, wherein the help screen comprises a guide portion that displays topics related to the steps in the process and an information portion that displays information related to a topic selected in the guide portion.

11. The GUI of claim 8, further comprising a plurality of sub-wizard screens associated with a sub-wizard application, which sub-wizard screens display prompts for specifications related to at least one of the prompts displayed on at least one of the input screens, wherein the sub-wizard screens are linked to one or more of the input screens.

12. The GUI of claim 11, wherein the sub-wizard application is a metric sub-wizard that displays prompts for associating a CPU resource allocation policy for one of the workloads with a metric.

13. The GUI of claim 8, wherein the input screens further comprise one or more input screens that receive specifications associating the defined workload with a metric-based CPU resource allocation policy.

14. The GUI of claim 13, wherein the metric-based CPU resource allocation policy is selected from the group consisting of a service level objective based allocation policy and a shares-per-metric based allocation policy.

15. A method of creating a configuration file for use with a resource allocator to allocate computer system resources among a plurality of workloads operating on the system, the method comprising:

displaying, as part of a graphical user interface (GUI) on a computer display, a prompt to identify a workload;

displaying, as part of the GUI, a prompt to assign an executable file to the identified workload;

displaying, as part of the GUI, a prompt to assign a priority level to the identified workload;

displaying, as part of the GUI, a prompt to assign a resource allocation policy to the identified workload;

displaying, as part of the GUI, a prompt to assign the workload with a user;

receiving specifications for the identified workload from a user input device;

creating a configuration file based on the received specifications;

displaying the configuration file on the display; and storing the configuration file in a memory.

16. The method of claim 15, wherein the computer system resources are CPU resources.

17. The method of claim 15, wherein the step of displaying a prompt to select a resource allocation policy comprises displaying a prompt to select a resource allocation policy selected from the group comprising a shares-per-metric-based policy, a service level objective based policy, a fixed-entitlement policy, and a CPU-usage policy.

18. The method of claim 15, further comprising displaying, in response to a selection made by a user input device interacting with the GUI, a plurality of screens of a sub-wizard, which screens guide a user through entry of one of the specifications.

19. A computer-readable storage medium having stored thereon computer-executable instructions for performing a method of creating a configuration file for use with a resource allocator that allocates computer system resources to workloads, the method comprising:

prompting a user to define a workload;

prompting the user to assign a CPU allocation policy to the workload;

prompting the user to edit or delete existing workloads;

prompting the user to assign one or more users to the workload;

receiving specifications from a user input device in response to each of the steps of prompting; and creating a configuration file based on the received specifications, which configuration file is used by a resource allocator to allocate CPU resources to the workload.

20. The medium of claim 19, wherein each of the steps of prompting comprises prompting using a graphical user interface (GUI) having a plurality of linked input screens, each of the input screens comprising:

an input portion that receives the specifications from the user input device;

a guide portion that displays a steps in a process of creating the configuration file;

an explanatory portion that displays information related to the specifications received in the input portion;

one or more buttons, responsive to the user input device, that allow the user to traverse the input screens; and a help button, responsive to the user input device, that displays a help screen comprising a guide portion that displays a list of help topics and an information portion that displays information related to a topic selected from the list.

21. The medium of claim 19, wherein the step of prompting the user to assign a CPU allocation policy comprises:
prompting the user to specify the CPU policy as either a metric-based policy or a non-metric based policy; and
if the user specifies a metric-based policy, prompting the user to select a metric using a metric sub-wizard comprising a plurality of screens.

22. A computer system that allocates central processing unit (CPU) resources among a plurality of workloads operating on the system, comprising:
a processor;
a memory connected to the processor;
a display connected to the processor;
a user input device connected to the processor;
a resource allocator connected to the processor, that allocates CPU resources to a plurality of workloads operating on the system, wherein the resource allocator comprises
a configuration file;
an execution file that accesses the configuration file and causes the CPU resources to be allocated according to specifications in the configuration file; and
a wizard that generates a graphical user interface (GUI) displayed on the display, which GUI includes a plurality of linked input screens that prompt a user for specifications related to the workloads, the specifications including a definition of a workload and a CPU resource allocation policy for the defined workload, wherein the wizard receives the specifications from the user input device in response to the displaying of the input screens, and wherein the wizard creates the configuration file based on the received specifications and the GUI prompts the user to specify a CPU resource allocation policy selected from the group consisting of metric or non-metric based policies, and wherein the GUI further comprises a metric sub-wizard that displays a plurality of screens for selecting a metric source, at least one of the sub-wizard screens being linked to at least one of the input screens.

23. The computer system of claim 22, wherein the wizard adds textual remarks in the configuration file when the wizard creates the configuration file, and wherein the GUI includes a display screen that displays text of the configuration file, which screen is linked to at least one of the input screens.

24. The computer system of claim 22, wherein the GUI prompts the user to associate each defined workload with a user.

25. A computer system that allocates central processing unit (CPU) resources among a plurality of workloads operating on the system, comprising:
a processor;
a memory connected to the processor;
a display connected to the processor;
a user input device connected to the processor;
a resource allocator connected to the processor, that allocates CPU resources to a plurality of workloads operating on the system, wherein the resource allocator comprises
a configuration file;
an execution file that accesses the configuration file and causes the CPU resources to be allocated according to specifications in the configuration file; and
a wizard that generates a graphical user interface (GUI) displayed on the display, which GUI includes a plurality of linked input screens that prompt a user for specifications related to the workloads, the specifications including a definition of a workload and a CPU resource allocation policy for the defined workload, wherein the wizard receives the specifications from the user input device in response to the displaying of the input screens, and wherein the wizard creates the configuration file based on the received specifications and the GUI prompts the user to associate each defined workload with a user.

* * * * *